United States Patent
Lettmann

(10) Patent No.: US 7,932,317 B1
(45) Date of Patent: Apr. 26, 2011

(54) AQUEOUS COATING MATERIAL AND MODULAR SYSTEM FOR PRODUCING SAME

(75) Inventor: Bernhard Lettmann, Drensteinfurt (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/018,336

(22) PCT Filed: Apr. 13, 2000

(86) PCT No.: PCT/EP00/03355
§ 371 (c)(1),
(2), (4) Date: Oct. 30, 2001

(87) PCT Pub. No.: WO00/68327
PCT Pub. Date: Nov. 16, 2000

(30) Foreign Application Priority Data

May 8, 1999 (DE) .................................. 199 21 457

(51) Int. Cl.
| | |
|---|---|
| *C09B 67/00* | (2006.01) |
| *C08F 8/30* | (2006.01) |
| *C08F 218/04* | (2006.01) |
| *C08G 18/08* | (2006.01) |
| *C08L 39/00* | (2006.01) |
| *C08L 75/00* | (2006.01) |

(52) U.S. Cl. ........ 524/502; 524/507; 524/555; 524/813; 525/329.5; 525/330.5; 428/505

(58) Field of Classification Search .................. 523/351, 523/353; 524/474, 475, 507, 502, 555, 813; 525/329.9, 330.5; 428/505
See application file for complete search history.

(56) References Cited

U.S. PATENT DOCUMENTS

| | | | |
|---|---|---|---|
| 3,290,350 A | 12/1966 | Hoover et al. ................ 260/453 |
| 4,005,961 A | 2/1977 | Manceau ...................... 425/190 |
| 4,046,729 A | 9/1977 | Scriven et al. ......... 260/29.2 TN |
| 4,130,577 A | 12/1978 | Nagato et al. .................. 260/453 |
| 4,223,357 A | 9/1980 | Vano .............................. 358/264 |
| 4,246,382 A | 1/1981 | Honda et al. .................... 526/79 |
| 4,268,542 A | 5/1981 | Sakakibara et al. .......... 427/195 |
| 4,322,325 A | 3/1982 | Esser et al. ..................... 523/457 |
| 4,439,616 A | 3/1984 | Singh et al. |
| 4,444,954 A | 4/1984 | Mels et al. ..................... 525/124 |
| 4,489,135 A | 12/1984 | Drexler et al. ............. 428/423.1 |
| 4,558,090 A | 12/1985 | Drexler et al. ................ 524/591 |
| 4,675,234 A | 6/1987 | Sachs et al. .................... 428/328 |
| 4,710,542 A | 12/1987 | Forgione et al. .............. 525/127 |
| 4,719,132 A | 1/1988 | Porter, Jr. ....................... 427/409 |
| 4,730,020 A | 3/1988 | Wilfinger et al. ............. 524/555 |
| 4,754,014 A | 6/1988 | Ryntz et al. |
| 4,851,460 A | 7/1989 | Stranghöner et al. ......... 523/407 |
| 4,895,910 A | 1/1990 | Isozaki et al. ............... 525/326.5 |
| 4,914,148 A | 4/1990 | Hille et al. ..................... 524/507 |
| 4,939,213 A | 7/1990 | Jacobs, III et al. |
| 5,028,639 A | 7/1991 | Treutlein et al. .............. 523/200 |
| 5,079,312 A | 1/1992 | Isozaki et al. ................. 525/479 |
| 5,084,541 A | 1/1992 | Jacobs, III et al. |
| 5,210,154 A | 5/1993 | Weidemeier et al. ......... 525/438 |
| 5,326,820 A | 7/1994 | Hoffmann et al. ............. 525/123 |
| 5,356,669 A | 10/1994 | Rehfuss et al. ............ 427/407.1 |
| 5,370,910 A | 12/1994 | Hille et al. ................. 427/407.1 |
| 5,474,811 A | 12/1995 | Rehfuss et al. ............ 427/407.1 |
| 5,516,559 A | 5/1996 | Röckrath et al. ........... 427/407.1 |
| 5,576,386 A | 11/1996 | Kempter et al. ................. 526/88 |
| 5,601,878 A | 2/1997 | Kranig et al. .................... 526/64 |
| 5,605,965 A | 2/1997 | Rehfuss et al. ................ 525/100 |
| 5,635,564 A | 6/1997 | Wieditz et al. ................. 525/194 |
| 5,667,847 A | 9/1997 | Muller et al. ................ 427/385.5 |
| 5,672,649 A * | 9/1997 | Brock et al. ................... 524/507 |
| 5,690,569 A | 11/1997 | Ledvina et al. ................ 474/111 |
| 5,726,258 A | 3/1998 | Fischer et al. ................. 427/386 |
| 5,965,213 A | 10/1999 | Sacharski et al. ............. 427/475 |
| 6,001,424 A | 12/1999 | Lettmann et al. .......... 427/407.1 |
| 6,001,915 A * | 12/1999 | Schwarte et al. .............. 524/457 |
| 6,159,556 A | 12/2000 | Möller et al. .................. 427/475 |

(Continued)

FOREIGN PATENT DOCUMENTS

CA  2107351  2/1992

(Continued)

OTHER PUBLICATIONS

International Search Report of International application No. PCT/EP00/03355 dated Jul. 31, 2000.

(Continued)

*Primary Examiner* — Nathan M Nutter
(74) *Attorney, Agent, or Firm* — Cantor Colburn LLP

(57) ABSTRACT

An aqueous coating material preparable by mixing with one another (A1) at least one substantially water-free base color comprising (a11) at least one optionally water-soluble or -dispersible binder, (a12) at least one color and/or effect pigment, and (a13) at least one optionally water-miscible organic solvent; (A2) at least one aqueous base color comprising (a21) at least one water-soluble or -dispersible binder, (a22) at least one color pigment, and (a23) water; and (B) at least one aqueous pigment-free mixing varnish comprising (b1) at least one water-soluble or -dispersible binder and (b2) water; and also, if desired, comprising (C) an aqueous medium comprising (c1) a rheology control additive; and also a modular system for preparing aqueous coating materials, comprising (I) at least one substantially water-free color and/or effect module, comprising at least one base color (A1), (II) at least one aqueous color module comprising at least one base color (A2), and (III) at least one aqueous, pigment-free mixing varnish module comprising at least one aqueous, pigment-free mixing varnish (B), and if desired (IV) at least one rheology module.

29 Claims, No Drawings

U.S. PATENT DOCUMENTS

| | | | |
|---|---|---|---|
| 6,344,501 B1 | 2/2002 | Sierakowski et al. | |
| 6,403,701 B1 * | 6/2002 | Reusmann et al. | 524/589 |

FOREIGN PATENT DOCUMENTS

| | | | |
|---|---|---|---|
| CA | 2073115 | | 7/1992 |
| CA | 2102169 | | 5/1994 |
| CA | 2102170 | | 5/1994 |
| CA | 2079498 | | 8/2001 |
| DE | 28 48 906 | A1 | 5/1979 |
| DE | 32 10 051 | A1 | 9/1983 |
| DE | 36 28 124 | A1 | 3/1988 |
| DE | 38 07 571 | A1 | 9/1988 |
| DE | 37 39 332 | A1 | 6/1989 |
| DE | 38 32 142 | C2 | 3/1992 |
| DE | 42 04 518 | A1 | 8/1993 |
| DE | 42 22 194 | | 1/1994 |
| DE | 42 22 194 | A1 | 1/1994 |
| DE | 44 21 823 | A1 | 1/1996 |
| DE | 196 13 547 | | 11/1996 |
| DE | 195 24 182 | A1 | 1/1997 |
| DE | 197 09 476 | A1 | 11/1997 |
| DE | 43 01 991 | A1 | 7/1998 |
| DE | 197 09 465 | A1 | 9/1998 |
| EP | 0 038 127 | A1 | 1/1981 |
| EP | 0 101 832 | A1 | 1/1981 |
| EP | 0 089 497 | A2 | 2/1983 |
| EP | 0081994 | * | 6/1983 |
| EP | 0 158 094 | A1 | 2/1985 |
| EP | 0 195 931 | A1 | 2/1986 |
| EP | 0 245 700 | A2 | 4/1987 |
| EP | 0 249 201 | A2 | 6/1987 |
| EP | 0 276 501 | A2 | 9/1987 |
| EP | 0 354 261 | A1 | 8/1988 |
| EP | 0 355 433 | A2 | 7/1989 |
| EP | 0 358 153 | B1 | 9/1989 |
| EP | 0 424 705 | A2 | 10/1990 |
| EP | 0 521 928 | B1 | 3/1991 |
| EP | 0422357 | A2 | 4/1991 |
| EP | 0 471 972 | A2 | 7/1991 |
| EP | 0 522 419 | A1 | 6/1992 |
| EP | 0 522 420 | A2 | 6/1992 |
| EP | 0 540 884 | A1 | 10/1992 |
| EP | 0 554 783 | A1 | 1/1993 |
| EP | 0 568 967 | A2 | 5/1993 |
| EP | 0 594 068 | | 10/1993 |
| EP | 0 594 071 | A1 | 10/1993 |
| EP | 0 594 142 | A1 | 10/1993 |
| EP | 0 596 460 | A2 | 11/1993 |
| EP | 0 604 622 | A1 | 12/1993 |
| EP | 0 614 951 | A2 | 3/1994 |
| EP | 0 730 613 | B1 | 11/1994 |
| EP | 0624577 | A1 | 11/1994 |
| EP | 0 698 773 | A1 | 8/1995 |
| EP | 1182513 | * | 2/2002 |
| WO | WO82/02387 | | 7/1982 |
| WO | WO92/22615 | | 12/1992 |
| WO | WO 93/17060 | | 9/1993 |
| WO | WO94/10211 | | 5/1994 |
| WO | WO94/10212 | | 5/1994 |
| WO | WO94/10213 | | 5/1994 |
| WO | WO 94/22968 | | 10/1994 |
| WO | WO 94/22969 | | 10/1994 |
| WO | WO95/27742 | | 10/1995 |
| WO | WO96/12754 | | 5/1996 |
| WO | WO97/12945 | | 4/1997 |
| WO | WO 99/50359 | | 10/1999 |

OTHER PUBLICATIONS

International Preliminary Examination Report for International application No. PCT/EP00/03355 dated May 3, 2001.

Written opinion for International application No. PCT/EP00/03355 dated May 3, 2001.

* cited by examiner

AQUEOUS COATING MATERIAL AND MODULAR SYSTEM FOR PRODUCING SAME

This application is a National Phase Application of Patent Application PCT/EP00/03355 filed on 13 Apr. 2000.

The present invention relates to a novel modular system (mixer system) for preparing novel aqueous coating materials in precision-attunable shades and optical effects. The present invention further relates to the use of the novel modular system in automotive OEM finishing and refinish and in the painting of plastics.

The German patent application DE-A-41 10 520 discloses a mixer system suitable for preparing aqueous coating materials in precision-attunable shades and optical effects as and when required. This known mixer system comprises substantially water-free color and/or effect base colors and at least one aqueous, pigment-free mixing varnish. Owing to their variability, this mixer system and the coating materials prepared from it go a substantial way toward meeting the ever-increasing requirements of the market. However, they are still capable of further improvement in terms of their hiding power.

The patent EP-A-0 608 773 discloses a modular system which comprises an effect module, containing at least 20% by weight water, and an aqueous, pigment-free mixing varnish. This known modular system also permits coating materials to be prepared in precision-attunable shades and optical effects. A disadvantage is that, owing to the high water content of the effect module, aluminum-based metallic effect pigments in said module frequently undergo decomposition, accompanied by the evolution of hydrogen. This impairs the storage stability of the effect module.

The patent EP-A-0 614 951 discloses a modular system comprising a color module, containing at least 20% by weight water, and an aqueous, pigment-free mixing varnish. This modular system, however, permits only the preparation of solid-color topcoat materials.

The patent EP-A-0 471 972 describes a modular system which comprises a substantially water-free effect module containing metallic effect pigments, an aqueous color module, and a rheology module. Instead of the aqueous color module, one possible alternative is to use an aqueous, pigment-free mixing varnish. A key feature of this known modular system is that the color of the coating material prepared from it can be adjusted only by way of the aqueous color module. Moreover, the hiding power of the coating materials prepared using this modular system is still capable of further improvement.

It is an object of the present invention to provide a new modular system which overall possesses greater storage stability than the modular systems known to date and which allows coating materials to be prepared simply, as and when required, in precision-attunable shades and optical effects, said coating materials being intended to provide coatings which possess a higher hiding power than the coatings of the prior art.

The invention accordingly provides the novel aqueous coating material preparable by mixing with one another (A1) at least one substantially water-free color- and/or effect-imparting base color comprising
- (a11) at least one optionally water-soluble or -dispersible binder,
- (a12) at least one color and/or effect pigment, and
- (a13) at least one optionally water-miscible organic solvent and also, if desired, comprising
- (a14) at least one crosslinking agent and/or
- (a15) at least one auxiliary and/or additive (coatings additive);

(A2) at least one aqueous color-imparting base color comprising
- (a21) at least one water-soluble or -dispersible binder,
- (a22) at least one color pigment, and
- (a23) water, and also, if desired, comprising
- (a24) at least one optionally water-miscible organic solvent,
- (a25) at least one crosslinking agent and/or
- (a26) at least one auxiliary and/or additive (coatings additive);

and (B) at least one aqueous, pigment-free mixing varnish comprising
- (b1) at least one water/soluble or -dispersible binder and
- (b2) water, and also, if desired, comprising
- (b3) at least one crosslinking agent and/or
- (b4) at least one auxiliary and/or additive (coatings additive);

and also, if desired, comprising (C) a pigment-free aqueous medium comprising
- (c1) at least one rheology control additive;

with the proviso that the coatings additives (a15), (a26) and/or (b4) may also comprise at least one rheology control additive (c1).

In the text below, the novel aqueous coating material is referred to as the "coating material of the invention".

The invention also provides the novel modular system for preparing aqueous coating materials which comprises at least the following key constituents:

(I) at least one substantially water-free color and/or effect module comprising
- (A1) at least one substantially color- and/or effect-imparting base color comprising
  - (a11) at least one optionally water-soluble or -dispersible binder,
  - (a12) at least one color and/or effect pigment, and
  - (a13) at least one optionally water-miscible organic solvent and also, if desired, comprising
  - (a14) at least one crosslinking agent and/or
  - (a15) at least one auxiliary and/or additive (coatings additive);

(II) at least one aqueous color module comprising
- (A2) at least one aqueous color-imparting base color comprising
  - (a21) at least one water-soluble or -dispersible binder,
  - (a22) at least one color pigment, and
  - (a23) water, and also, if desired, comprising
  - (a24) at least one optionally water-miscible organic solvent,
  - (a25) at least one crosslinking agent and/or
  - (a26) at least one auxiliary and/or additive (coatings additive);

and (III) at least one aqueous, pigment-free mixing varnish module comprising
- (B) at least one pigment-free mixing varnish comprising
  - (b1) at least one water-soluble or -dispersible binder and
  - (b2) water, and also, if desired, comprising
  - (b3) at least one crosslinking agent and/or
  - (b4) at least one auxiliary and/or additive (coatings additive);

and also, if desired, comprising (IV) at least one pigment-free rheology module comprising
- (C) an aqueous medium comprising
  - (c1) at least one rheology control additive;

with the proviso that the coatings additives (a15), (a26) and/or (b4) may also comprise at least one rheology control additive (c1).

In the context of the present invention, the term "module" refers to a standardized, ready-to-use commercial product whose profile of performance properties is precisely matched to and supplements the profiles of properties of other modules, so that the modules overall may be combined to form a modular system.

In the text below, the novel modular system for preparing aqueous coating materials is referred to as the "modular system of the invention".

The invention further provides a novel process for preparing an aqueous coating material with precisely defined shade and optical effect, in which the aqueous coating material is prepared shortly before its application, by mixing modules differing in material composition and function and stored separately from one another, and which involves mixing with one another at least [sic]

(I) at least one substantially water-free color and/or effect module comprising
  (A1) at least one substantially water-free color- and/or effect-imparting base color comprising
    (a11) at least one optionally water-soluble or -dispersible binder,
    (a12) at least one color and/or effect pigment, and
    (a13) at least one optionally water-miscible organic solvent and also, if desired, comprising
    (a14) at least one crosslinking agent and/or
    (a15) at least one auxiliary and/or additive (coatings additive);
(II) at least one aqueous color module comprising
  (A2) at least one aqueous color-imparting base color comprising
    (a21) at least one water-soluble or -dispersible binder,
    (a22) at least one color pigment, and
    (a23) water, and also, if desired, comprising
    (a24) at least one optionally water-miscible organic solvent,
    (a25) at least one crosslinking agent and/or
    (a26) at least one auxiliary and/or additive (coatings additive);
  and
(III) at least one pigment-free mixing varnish module comprising
  (B) at least one aqueous, pigment-free mixing varnish comprising
    (b1) at least one water-soluble or -dispersible binder and
    (b2) water, and also, if desired, comprising
    (b3) at least one crosslinking agent and/or
    (b4) at least one auxiliary and/or additive (coatings additive);
  and also, if desired, comprising
(IV) at least one pigment-free rheology module comprising
  (C) an aqueous medium comprising
    (c1) at least one rheology control additive;
with the proviso that the coatings additives (a15), (a26) and/or (b4) may also comprise at least one rheology control additive (c1).

In the text below, the novel process for preparing the coating material of the invention is referred to as the "process of the invention".

In the light of the prior art it was surprising and unforeseeable for the skilled worker that the object on which the invention is based might be achieved with the aid of the modular system of the invention. A particular surprise was that the modular system of the invention possesses a storage stability which matches or even exceeds that of the known modular systems. A further surprise was that the modular system of the invention, while possessing otherwise identical or even better performance properties, provides coating materials of the invention that have a significantly higher pigment content and can be used to produce coatings which in terms of their hiding power are superior to the prior art coatings. Especially surprising was that the storage stability of the individual modules also exceeds that of the known modules. Not least a surprise was the key advantage that the aqueous color module (II) and the aqueous, pigment-free mixing varnish module (III), on the one hand, and the substantially water-free color and/or effect module (I), on the other, are very highly compatible with one another and cause no problems whatsoever on mixing. Moreover, it proves to be a further key advantage of the modular system of the invention that, to the extent that practice requires it, it may be used like the mixer system known from the German patent application DE-A-40 10 520.

The modular system of the invention accordingly comprises at least one substantially water-free color and/or effect module (I), at least one aqueous color module and at least one aqueous, pigment-free mixing varnish module (III). What this means in the context of the present invention is that besides the aqueous color module (II) there is always at least one substantially water-free module (I) which takes on part of the function of coloring.

Accordingly, the first variant of the modular system of the invention comprises at least one substantially water-free color module (I), which therefore takes on part of the function of coloring, at least one aqueous color module (II), and at least one aqueous, pigment-free mixing varnish module (III). This variant is used to produce solid-color topcoats and multicoat systems which are substantially free from optical effects such as metallic effects.

In accordance with the invention, the modular system of the invention in its second variant, which is preferred in accordance with the invention, comprises at least one substantially water-free color and effect module (I), which thus takes on all of the function of effect and part of the function of coloring, at least one aqueous color module (II), and at least one aqueous, pigment-free mixing varnish module (III).

In accordance with the invention, the modular system of the invention in its third variant, which is likewise preferred in accordance with the invention, comprises at least one substantially water-free effect module (I), which thus serves solely for imparting effect, at least one substantially water-free color module (I), at least one aqueous color module (II), and at least one aqueous, pigment-free mixing varnish module (III).

The substantially water-free color and/or effect module (I), the aqueous color module (II) and/or the aqueous, pigment-free mixing varnish module (III) may comprise at least one rheology control additive. In accordance with the invention it is of advantage if at least one of these additives is present only in the aqueous color module (II) and/or in the aqueous, pigment-free mixing varnish module (III), especially only in the aqueous, pigment-free mixing varnish module (III).

However, in accordance with the invention, particular additional advantages result if the rheology control additive is present additionally or only, but especially only, in the pigment-free rheology module (IV). Modular systems of the invention which comprise at least one pigmented rheology module (IV) are therefore used with particular preference.

The first key constituent of the modular system of the invention is at least one substantially water-free color and/or effect module (I).

In the context of the present invention, the phrase "substantially water-free" means that the color and/or effect modules (I) in question contain no water at all or contain the water only in amounts such as result from the water content of the starting products. These amounts are preferably below 5% by weight, with particular preference 3% by weight, with very particular preference 2% by weight, and in particular 1% by weight water, based on the total amount of the color and/or effect module (I) in question.

Moreover, the term "color and/or effect module" indicates that this module is used to set the shading and/or optical effect of the coating material prepared using it. Accordingly, the module (I) for use in accordance with the invention comprises alternatively a color module (I), an effect module (I), or a color and effect module (I).

The color module (I) for use in accordance with the invention is used in particular to prepare coating materials of the invention with precision-attunable color shade for the production of solid-color topcoats and basecoats, preferably basecoats. The optical effect of the coating materials of the invention is adjusted by means of the effect module (I) for use in accordance with the invention. Using the color and effect module (I) for use in accordance with the invention it is possible to adjust precisely both the color shade and the optical effect of the coating materials of the invention.

The key constituent of the effect module (I) for use in accordance with the invention is at least one substantially water-free color- and/or effect-imparting base color (A1). It is subject, mutatis mutandis, to the same comments made regarding the effect module (I).

The first key constituent of the base color (A1) is at least one optionally water-soluble or -dispersible binder (a11). If use is made of a binder (a11) which is not soluble or dispersible in water, it must be water-dispersible in the presence of the binders (a21) and (b1) described below.

Suitable binders (a11) include in principle all binders as also used in the known modular system described in the patents DE-A-41 10 520, EP-A-0 608 773, and EP-A-0 614 951.

Suitable binders (a11) which per se are not soluble or dispersible in water but which can be dispersed in water in the presence of the water-soluble or dispersible binders (b1) come from the oligomer and/or polymer classes described below, with the proviso that they contain so little, if any at all, of the hydrophilic functional groups (i), (ii) or (iii) described below that no solubility or dispersibility in water results.

The suitable water-soluble or dispersible binders (a11) are oligomeric or polymeric resins. The binders (a11) are physically drying or else contain functional groups which are able to react with the crosslinking agents (a14), (a25) or (b3) described below.

Examples of suitable functional groups are amino, thio, carbonate, epoxide and/or hydroxyl groups, of which the hydroxyl groups are particularly advantageous and are therefore particularly preferred in accordance with the invention.

Examples of suitable inventively preferred binders (a11) are linear and/or branched and/or block, comb and/or random poly(meth)acrylates or acrylate addition copolymers, polyesters, alkyds, amino resins, polyurethanes, acrylated polyurethanes, acrylated polyesters, polylactones, polycarbonates, polyethers, epoxy resin-amine adducts, (meth)acrylatediols, partially saponified polyvinyl esters or polyureas, of which the acrylate addition copolymers, the polyesters, the polyurethanes, the polyethers, and the epoxy resin-amine adducts are particularly advantageous and are therefore used with particular preference.

As regards the preparability, handling, and particularly advantageous properties of the coating materials of the invention prepared therewith, the acrylate addition copolymers, the polyesters and/or the polyurethanes (a11), but especially the polyurethanes (a11), offer very particular advantages, and so are used with very particular preference in accordance with the invention.

Preferably, the binders (a11) per se are soluble or dispersible in water.

Examples of suitable water-soluble or -dispersible binders (a11) contain alternatively (i) functional groups which can be converted into cations by neutralizing agents and/or quaternizing agents, and/or cationic groups
or
(ii) functional groups which can be converted into anions by neutralizing agents, and/or anionic groups
and/or
(iii) nonionic hydrophilic groups.

Examples of suitable functional groups (i) for use in accordance with the invention that can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (i) for use in accordance with the invention are primary, secondary, tertiary or quaternary ammonium groups, tertiary sulfonium groups or quaternary phosphonium groups, preferably quaternary ammonium groups or tertiary sulfonium groups, but especially tertiary sulfonium groups.

Examples of suitable functional groups (ii) for use in accordance with the invention that can be converted into anions by neutralizing agents are carboxylic acid, sulfonic acid or phosphonic acid groups, especially carboxylic acid groups.

Examples of suitable anionic groups (ii) for use in accordance with the invention are carboxylate, sulfonate or phosphonate groups, especially carboxylate groups.

Examples of suitable nonionic hydrophilic groups (iii) for use in accordance with the invention are polyether groups, especially poly(alkylene ether) groups.

The selection of the groups (i) or (ii) is to be made so as to rule out the possibility of any disruptive reactions with the functional groups which are able to react with the crosslinking agents (a14), (a25) or (b3) described below. The skilled worker will therefore be able to make the selection in a simple way on the basis of his or her knowledge in the art.

Examples of suitable neutralizing agents for functional groups (i) convertible into cations are inorganic and organic acids such as sulfuric acid, hydrochloric acid, phosphoric acid, formic acid, acetic acid, lactic acid, dimethylolpropionic acid or citric acid.

Examples of suitable neutralizing agents for functional groups (ii) convertible into anions are ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine, triethanolamine, and the like. Neutralization may take place in organic phase or in aqueous phase. Dimethylethanolamine is a preferred neutralizing agent.

In general the amount of neutralizing agent is chosen is [sic] so that from 1 to 100 equivalents, preferably from 50 to 90 equivalents, of the functional groups (i) or (ii) of the binder (a11) are neutralized.

As regards the preparability, handling, and particularly advantageous properties of the coating materials and modular systems of the invention that are prepared therewith, the binders (a11) which contain the anion-forming groups and/or anions (ii), especially the carboxylic acid and/or carboxylate groups, offer very particular advantages, and so are used with very particular preference in accordance with the invention.

In accordance with the invention it is of advantage if the binders (a11) have a number-average molecular weight Mn of from 750 to 2,000,000, preferably from 750 to 1,000,000, with particular preference from 750 to 500,000, and in particular from 750 to 300,000 daltons, a molecular weight polydispersity U of from 1.0 to 10, preferably from 1.0 to 8, with particular preference from 1.0 to 6, and in particular from 1.0 to 4 if ionic stabilization is desired, an acid number of from 10 to 150, preferably from 15 to 100, with particular preference from 20 to 80, and in particular from 25 to 70 mg KOH/g, and, where hydroxyl groups are present, an OH number of from 10 to 350, preferably from 15 to 250, with particular preference from 20 to 200, and in particular from 25 to 150 mg KOH/g.

Within the abovementioned, very particularly advantageous range of the number-average molecular weight Mn, from 750 to 300,000 daltons, the range from 750 to 30,000 daltons is deserving of emphasis since binders (a11) having such a number-average molecular weight Mn offer additional advantages in terms of the performance properties of the resultant base colors (A1). Further advantages arise if the binders (a11) have a number-average molecular weight Mn of from 850 to 20,000 daltons and in particular from 950 to 15,000 buildings [sic].

Examples of very particularly preferred binders (a11) for use in accordance with the invention are (a111) the acrylate addition copolymers (a11) described below and containing carboxylic acid and/or carboxylate groups and optionally hydroxyl groups, (a112) the polyester resins (a11) described below and containing carboxylic acid and/or carboxylate groups and optionally hydroxyl groups, and/or (a113) the polyurethane resins (a11) described below and containing carboxylic acid and/or carboxlylate [sic] groups and optionally hydroxyl groups.

Use is made in particular of acrylate addition copolymers (a111) obtainable in the presence of at least one polymerization initiator by addition polymerization in bulk, by solution polymerization in an organic solvent or a solvent mixture, by emulsion polymerization or by precipitation polymerization in water of m1) a (meth)acrylic ester which is different from but copolymerizable with (m2), (m3), (m4), (m5), and (m6) and is substantially free from acid groups, or a mixture of such monomers, m2) an ethylenically unsaturated monomer which is copolymerizable with (m1), (m3), (m4), (m5), and (m6) but different from (m5), carries at least one hydroxyl group per molecule, and is substantially free from acid groups, or a mixture of such monomers, m3) an ethylenically unsaturated monomer which is copolymerizable with (m1), (m2), (m4), (m5), and (m6) and carries per molecule at least one acid group which can be converted into the corresponding acid anion groups, or a mixture of such monomers, and m4) if desired, one or more vinyl esters of alpha-branched monocarboxylic acids having 5 to 18 carbon atoms per molecule, and/or m5) if desired, at least one reaction product of acrylic acid and/or methacrylic acid with the glycidyl ester of an alpha-branched monocarboxylic acid having 5 to 18 carbon atoms per molecule or, instead of the reaction product, an equivalent amount of acrylic and/or methacrylic acid which is then reacted, during or after the polymerization reaction, with the glycidyl ester of an alpha-branched monocarboxylic acid having 5 to 18 carbon atoms per molecule, m6) if desired, an ethylenically unsaturated monomer which is copolymerizable with (m1), (m2), (m3), (m4), and (m5) but different from (m1), (m2), (m4), and (m5), and is substantially free from acid groups, or a mixture of such monomers, the nature and amount of (m1), (m2), (m3), (m4), (m5), and (m6) being selected such that the polyacrylate resin (b1) has the desired OH number, acid number, and molecular weight.

To prepare the acrylate copolymers (a111), the monomer (m1) used may comprise any (meth)acrylic alkyl or cycloalkyl ester having up to 20 carbon atoms in the alkyl radical that is copolymerizable with (m2), (m3), (m4), (m5), and (m6), especially methyl, ethyl, propyl, n-butyl, sec-butyl, tert-butyl, hexyl, ethylhexyl, stearyl, and lauryl acrylate or methacrylate; cycloaliphatic (meth)acrylic esters, especially cyclohexyl, isobornyl, dicyclopentadienyl, octahydro-4,7-methano-1H-indene methanol or tert-butylcyclohexyl (meth)acrylate; (meth)acrylic acid oxaalkyl or oxacycloalkyl esters such as ethyl triglycol (meth)acrylate and methoxyoligoglycol (meth)acrylate having a molecular weight Mn of preferably 550; or other ethoxylated and/or propoxylated, hydroxyl-free (meth)acrylic acid derivatives. These monomers may include minor amounts of relatively highly functional (meth)acrylic acid alkyl or cycloalkyl esters, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. In the context of the present invention, minor amounts of relatively highly functional monomers are those amounts which do not lead to crosslinking or gelling of the polyacrylate resins.

As component (m2) it is possible to use ethylenically unsaturated monomers copolymerizable with (m1), (m2), (m3), (m4), (m5), and (m6) but different from (m5) which carry per molecule at least one hydroxyl group and are substantially free from acid groups, such as hydroxyalkyl esters of acrylic acid, methacrylic acid or another alpha,beta-ethylenically unsaturated carboxylic acid which are derived from an alkylene glycol which is esterified with the acid or are obtainable by reacting the acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. With regard to these relatively highly functional monomers (m2), the comments made regarding the relatively highly functional monomers (a1) [sic] apply accordingly. The fraction of trimethylolpropane monoallyl ether is customarily from 2 to 10% by weight, based on the overall weight of the monomers (m1) to (m6) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinically unsaturated polyols, such as trimethylolpropane monoallyl ether in particular, may be used as sole hydroxyl-containing monomers, but in particular may be used proportionally in combination with other of the hydroxyl-containing monomers mentioned.

As component (m3) it is possible to use any ethylenically unsaturated monomer which carries per molecule at least one acid group, preferably a carboxyl group, and is copolymerizable with (m1), (m2), (m4), (m5), and (m6), or a mixture of such monomers (m3). As component (m3) it is particularly preferred to use acrylic acid and/or methacrylic acid. However, it is also possible to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated sulfonic or phosphonic acids, and/or their partial esters, as component (m3). Also suitable as component (m3) are the mono(meth)acryloyloxyethyl esters of maleic acid, succinic acid, and phthalic acid.

As component (m4), use is made of one or more vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or with carbon monoxide and water results in a mixture of carboxylic acids in which the carboxyl groups are located predominantly on a quaternary carbon atom. Examples of other olefinic starting materials are propylene trimer, propylene tetramer, and diisobutylene. Alternatively, the vinyl esters may be prepared from the acids in a manner known per se, for example, by reacting the acid with acetylene. Particular preference—owing to their ready availability—is given to the use of vinyl esters of saturated aliphatic monocarboxylic acids having 9 to 11 carbon atoms with branching on the alpha carbon atom.

As component (m5), use is made of the reaction product of acrylic acid and/or methacrylic acid with the glycidyl ester of an alpha-branched monocarboxylic acid having 5 to 18 carbon atoms per molecule. Glycidyl esters of highly branched monocarboxylic acids are available under the tradename "Cardura". The reaction of the acrylic or methacrylic acid with the glycidyl ester of a carboxylic acid having a tertiary alpha carbon atom may take place before, during or after the polymerization reaction. As component (m5) it is preferred to use the reaction product of acrylic and/or methacrylic acid with the glycidyl ester of Versatic acid. This glycidyl ester is available commercially under the name "Cardura E10".

As monomers (m6) it is possible to use all ethylenically unsaturated monomers which are copolymerizable with (m1), (m2), (m3), (m4), and (m5), different from (m1), (m2), (m3), and (m4), and substantially free from acid groups, or mixtures of such monomers. Suitable monomers (m6) include
olefins such as ethylene, propylene, but-1-ene, pent-1-ene, hex-1-ene, cyclohexene, cyclopentene, norbonene [sic], butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N-cyclohexyl-N-methyl-(meth)-acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkyl-styrenes, especially alpha-methylstyrene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and/or the vinyl ester of 2-methyl-2-ethylheptanoic acid; and/or polysiloxane macromonomers having a number-average molecular weight Mn of from 1 000 to 40 000, preferably from 2 000 to 20 000, with particular preference from 2 500 to 10 000, and in particular from 3 000 to 7 000, and containing on average from 0.5 to 2.5, preferably from 0.5 to 1.5, ethylenically unsaturated double bonds per molecule, as described in DE-A 38 07 571 on pages 5 to 7, in. DE-A 37 06 095 in columns 3 to 7, in EP-B-0 358 153 on pages 3 to 6, in U.S. Pat. No. 4,754,014 in columns 5 to 9, in DE-A 44 21 823 or in the international patent application WO 92/22615 on page 12 line 18 to page 18 line 10, or acryloyloxysilane-containing vinyl monomers, preparable by reacting hydroxy-functional silanes with epichlorohydrin and then reacting the reaction product with methacrylic acid and/or hydroxyalkyl esters of (meth)acrylic acid.

It is preferred to use vinylaromatic hydrocarbons (m6).

The nature and amount of the monomers (m1) to (m6) are selected such that the finely divided, solid acrylate copolymer (a111) has the desired OH number, acid number, and glass transition temperature.

Viewed in terms of its method, the preparation of the acrylate copolymers (a111) used in accordance with the invention has no special features but instead takes place in accordance with the customary and known techniques of copolymerization in bulk, solution or emulsion or by suspension or precipitation polymerization.

For the preparation of the acrylate copolymers (a111) used with preference in accordance with the invention it is advantageous to use polymerization initiators.

Examples of suitable polymerization initiators are initiators which form free radicals, such as tert-butyl peroxyethylhexanoate, benzoyl peroxide, di-tert-amyl peroxide, azobisisobutyronitrile, and tert-butyl perbenzoate, for example. The initiators are used preferably in an amount of from 1 to 25% by weight, with particular preference from 2 to 10% by weight, based on the overall weight of the monomers.

The polymerization is appropriately conducted at a temperature of from 80 to 200° C., preferably from 110 to 180° C.

The acrylate copolymer (a111) is preferably prepared by a two-stage process, since in this way the resulting novel coating materials have better processing properties. It is therefore preferred to use acrylate copolymers (b11) [sic] obtainable by
1. polymerizing a mixture of the monomers (m1), (m2), (m4), (m5), and (m6), or a mixture of portions of the monomers (m1), (m2), (m4), (m5), and (m6), in an organic solvent, 2. after at least 60% by weight of the mixture consisting of the monomers (m1), (m2), (m4), (m5) and, if used, (m6) have been added, adding (m3) and any remainder of the monomers (m1), (m2), (m4), (m5), and (m6), and continuing polymerization, and
3. after the end of the polymerization, if desired, at least partially neutralizing the polyacrylate resin obtained, i.e., converting the acid groups into the corresponding acid anion groups.

Besides this, however, it is also possible to introduce the monomers (m4) and/or (m5) together with at least one portion of the solvent and to meter the remaining monomers into this initial charge. Furthermore, it is also possible for only part of the monomers (m4) and/or (m5) to be included in the initial charge, together with at least one portion of the solvent, and for the remainder of these monomers to be added as described above. Preferably, for example, at least 20% by weight of the solvent and approximately 10% by weight of the monomers (m4) and (m5), and also, if desired, portions of the monomers (m1) and (m6), are introduced initially.

Preference is further given to preparing the acrylate copolymers (a111) by a two-stage process in which the first stage lasts for from 1 to 8 hours, preferably from 1.5 to 4 hours, and the addition of the mixture of (m3) and any remainder of the monomers (m1), (m2), (m4), (m5), and (m6) is made over the course of from 20 to 120 minutes, preferably over the course of from 30 to 90 minutes. After the end of the addition of the mixture of (m3) and any remainder of the monomers (m1), (m2), (m4), (m5), and (m6), polymerization is continued until all the monomers used have undergone substantially complete reaction. In this procedure, the second stage may immediately follow the first. Alternatively, the second stage may not be commenced until after a certain time has elapsed, for example, after from 10 minutes to 10 hours.

The amount and rate of addition of the initiator are preferably chosen so as to give a polyacrylate resin (a111) having the desired number-average molecular weight Mn. It is preferred to commence the initiator feed a certain time, generally about 15 minutes, before the feed of the monomers. Preference is further given to a process in which the addition of initiator is commenced at the same point in time as the addition of the monomers and ended about half an hour after the addition of the monomers has ended. The initiator is preferably added in a constant amount per unit time. After the end of the initiator addition, the reaction mixture is held at polymerization temperature until (generally 1.5 hours) all of the monomers used have undergone substantially complete reaction. The term "substantially complete reaction" is intended to denote that preferably 100% by weight of the monomers used have been reacted but that it is also possible for a small residual monomer content of not more than about 0.5% by weight, based on the weight of the reaction mixture, to remain unreacted.

Preferably, the monomers for preparing the acrylate copolymers (a111) are polymerized at not too high a polymerization solids, preferably at a polymerization solids of from 80 to 50% by weight, based on the comonomers, and subsequently the solvents are removed in part by distillation, so that the resulting acrylate copolymer solutions (a111) have a solids content of preferably from 100 to 60% by weight.

The preparation of the acrylate copolymers (a111) for use in accordance with the invention is carried out using the methods of continuous or batchwise copolymerization, under atmospheric or superatmospheric pressure, that are known and customary in the polymers field in stirred tanks, autoclaves, tube reactors or Taylor reactors.

Examples of suitable (co)polymerization processes for the preparation of the acrylate copolymers (a111) are described in the patents DE-A-197 09 465, DE-C-197 09 476, DE-A-28 48 906, DE-A-195 24 182, EP-A-0 554 783, WO 95/27742, DE-A-38 41 540, and WO 82/02387.

Advantageous reactors are Taylor reactor, especially for copolymerization in bulk, solution or emulsion.

Taylor reactors, which serve to convert substances under the conditions of Taylor flow, are known. They consist essentially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. As well as the angular velocity of the stirrer, the Taylor number is also dependent on the kinematic viscosity $v$ of the fluid in the gap and on the geometric parameters, the external radius of the inner cylinder $r_i$, the internal radius of the outer cylinder $r_o$ and the gap width d, the difference between the two radii, in accordance with the following formula:

$$Ta = \omega_i r_i d v^{-1} (d/r_i)^{1/2} \qquad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or a vortex cell.

The basis of this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The viscosity force acts counter to the centrifugal force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of advantage in accordance with the invention here are Taylor reactors having an external reactor wall within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor vortex flow are met over substantially the entire reactor length in the reactor volume, i.e. in such a way that the annular gap broadens in the direction of flow traversal.

Examples of suitable polyester resins (a112) are known from the patents DE-A-29 26 584, DE-A-38 32 142, and EP-A-0 301 300. They are obtainable by reacting p1) optionally sulfonated polycarboxylic acids or their esterifiable derivatives, together if desired with monocarboxylic acids, p2) polyols, together if desired with monools, p3) optionally, further modifying components, and p4) optionally, a component which is reactive with the reaction product of (p1), (p2) and, where used, (p3).

Examples of polycarboxylic acids which may be used as component (p1) are aromatic, aliphatic, and cycloaliphatic polycarboxylic acids. As component (p1) it is preferred to use aromatic and/or aliphatic polycarboxylic acids.

Examples of suitable polycarboxylic acids are phthalic acid, isophthalic acid, terephthalic acid, phthalic, isophthalic or terephthalic monosulfonate, halophthalic acids, such as tetrachloro- and/or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid or cyclobutanetetracarboxylic acid. The cycloaliphatic polycarboxylic acids may be used both in their cis form and in their trans form and also as a mixture of both forms. Also suitable are the esterifiable derivatives of the abovementioned polycarboxylic acids, such as, for example, their monoesters or polyesters with aliphatic alcohols having from 1 to 4 carbon atoms or hydroxy alcohols having from 1 to 4 carbon atoms. It is also possible, furthermore, to use the anhydrides of the abovementioned acids, where they exist.

If desired, it is possible together with the polycarboxylic acids to use monocarboxylic acids, such as benzoic acid, tert-butylbenzoic acid, lauric acid, isononanoic acid, and fatty acids of naturally occurring oils, for example. A preferred monocarboxylic acid used is isononanoic acid.

Suitable alcohol components (p2) for preparing the polyester (a112) are polyhydric alcohols, such as ethylene glycol, propanediols, butanediols, hexanediols, neopentyl hydroxypivalate, neopentyl glycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, trishydroxyethyl isocyanate, polyethylene glycol, polypropylene glycol, alone or together with monohydric alcohols, such as butanol, octanol, lauryl alcohol, cyclohexanol, tert-butylcyclohexanol, and ethoxylated and/or propoxylated phenols, for example.

Particularly suitable components (p3) for preparing the polyesters (a112) are compounds having a group which is reactive toward the functional groups of the polyester, with the exception of the compounds mentioned as component (p4). As modifying component (p3) it is preferred to use polyisocyanates and/or diepoxide compounds, and possibly monoisocyanates and/or monoepoxide compounds as well. Suitable components (p3) are described, for example, in DE-A-40 24 204 on page 4 lines 4 to 9.

Suitable components (p4) for preparing the polyester resins (a112) are compounds which besides a group which is reactive toward the functional groups of the polyester (b12) additionally contain a tertiary amino group, examples being monoisocyanates containing at least one tertiary amino group or mercapto compounds containing at least one tertiary amino group. For details, refer to DE-A-40 24 204, page 4 lines 10 to 49.

The polyester resins (a112) are prepared by the known methods of esterification, as described for example in DE-A-40 24 204, page 4 lines 50 to 65. The reaction takes place normally at temperatures between 180 and 280° C., in the presence or absence of an appropriate esterification catalyst, such as lithium octoate, dibutyltin oxide, dibutyltin dilaurate or para-toluenesulfonic acid, for example.

The preparation of the polyester resins (a112) is customarily conducted in the presence of small amounts of an appropriate solvent as azeotrope former. Examples of azeotrope formers used include aromatic hydrocarbons, such as xylene in particular, and (cyclo)aliphatic hydrocarbons, e.g., cyclohexane or methylcyclohexane.

Particular preference is given to using polyester resins (a112) prepared by a two-stage process by first preparing a hydroxyl-containing polyester having an OH number of from 100 to 300 mg KOH/g, an acid number of less than 10 mg KOH/g, and a number-average molecular weight Mn of from 500 to 2000 daltons and then reacting this polyester in a second stage with carboxylic anhydrides, to give the desired polyester resin (a112). The amount of carboxylic anhydrides in this case is chosen such that the resulting polyester resin (a112) has the desired acid number. Anhydrides suitable for this reaction are all commonly used acid anhydrides, such as hexahydrophthalic anhydride, trimellitic anhydride, pyromellitic anhydride, phthalic anhydride, camphoric anhydride, tetrahydrophthalic anhydride, succinic anhydride, and mixtures of these and/or other anhydrides and, in particular, anhyrides [sic] of aromatic polycarboxylic acids, such as trimellitic anhydride.

It is possible if desired for the acrylate copolymer (a111) to have been prepared at least partly in the presence of the polyester resin (a112). In this case it is advantageous to prepare at least 20% by weight and with particular advantage from 40 to 80% by weight of the acrylate copolymer (a111) in the presence of the polyester resin (a112). Any remainder of the acrylate copolymer (a111) is added subsequently to the module (I). In this context it is possible for this resin, already polymerized, to have the same monomer composition as the acrylate copolymer (a111) synthesized in the presence of the polyester resin (a112). It is, however, also possible to add a hydroxyl-containing acrylate copolymer (a111) having a different monomer composition. A further possibility is to add a mixture of different acrylate copolymer [sic] (a111) and/or polyester resins (a112), with possibly one resin having the same monomer composition as the acrylate copolymer (a111) synthesized in the presence of the polyester resin (a112).

Suitable polyurethane resins (a113) for use in accordance with the invention, containing acid groups and also, where appropriate, hydroxyl groups, are described, for example, in the following documents: EP-A-0 089 497, EP-A-0 158 099, EP-A-0 195 931, EP-A-0 354 261, EP-A-0 422 357, EP-A-0 424 705, EP-A-0 355 433, DE-A-35 45 618, DE-A-38 13 866, DE-A-32 10 051, DE-A-26 24 442, DE-A-37 39 332, DE-A-36 28 124, DE-A-29 26 584, DE-A-33 21 180, DE-A-38 13 866, DE-A-40 05 961, U.S. Pat. No. 4,719,132, U.S. Pat. No. 4,558,090, and U.S. Pat. No. 4,489,135.

Use is made in particular of polyurethane resins (a113), which are preparable by reacting isocyanato-containing prepolymers with compounds that are reactive toward isocyanate groups.

Prepolymers containing isocyanate groups may be prepared by reacting polyols having a hydroxyl number of from 10 to 1800, preferably from 50 to 1200 mg KOH/g with excess polyisocyanates at temperatures of up to 150° C., preferably from 50 to 130° C., in organic solvents which cannot react with isocyanates. The equivalents ratio of NCO groups to OH groups is between 2.0:1.0 and >1.0:1.0, preferably between 1.4:1 and 1.1:1.

The polyols used to prepare the prepolymer may be of low and/or high molecular mass and may contain groups which are slow to react and are anionic, or are capable of forming anions. It is also possible to use low molecular mass polyols having a molecular weight of from 60 up to 400 daltons to prepare the isocyanato-containing prepolymers. In this case amounts of up to 30% by weight of the total polyol constituents, preferably from about 2 to 20% by weight, are used.

In order to obtain an NCO prepolymer of high flexibility, a high proportion of a predominantly linear polyol having a preferred OH number of from 30 to 150 mg KOH/g should be added. Up to 97% by weight of the overall polyol may consist of saturated and unsaturated polyesters and/or polyethers having a number-average molecular weight Mn of from 400 to 5000 daltons. The selected polyetherdiols should not introduce excessive amounts of ether groups, since otherwise the polymers formed start to swell in water. Polyesterdiols are prepared by esterifying organic dicarboxylic acids or their anhydrides with organic diols or are derived from a hydroxycarboxylic acid dr a lactone. In order to prepare branched polyesterpolyols, it is possible to a minor extent to use polyols or polycarboxylic acids having a higher functionality.

With preference, at least a certain fraction of the alcohol component used to prepare the polyurethane resins (a113) comprises $u_1$) at least one diol of the formula 1

in which $R_1$ and $R_2$ each represent an identical or different radical and are an alkyl radical having from 1 to 18 carbon atoms, an aryl radical or a cycloaliphatic radical, with the proviso that $R_1$ and/or $R_2$ must not be methyl, and/or $u_2$) at least one diol of the formula 2

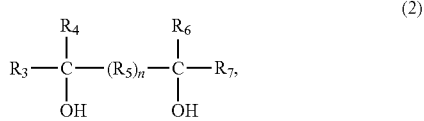

in which $R_3$, $R_4$, $R_6$ and $R_7$ each represent identical or different radicals and are an alkyl radical having from 1 to 6 carbon atoms, a cycloalkyl radical or an aryl radical and $R_5$ is an alkyl radical having from 1 to 6 carbon atoms, an aryl radical or an unsaturated alkyl radical having from 1 to 6 carbon atoms, and n is either 0 or 1.

Suitable diols ($u_1$) include all propanediols of the formula 1 in which either $R_1$ or $R_2$ or $R_1$ and $R_2$ is or are not methyl, such as, for example 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol or 2-cyclohexyl-2-methyl-1,3-propanediol.

Diols ($u_2$) of the general formula 2 that may be used include, for example, 2,5-dimethyl-2,5-hexanediol, 2,5-di-ethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene [sic], and 1,3-(2'-hydroxypropyl)benzene [sic].

Preferred diols ($u_1$) used include 2-propyl-2-ethyl-1,3-propanediol, 2,2-diethyl-1,3-propanediol, 2-butyl-2-ethyl-1,3-propanediol, and 2-phenyl-2-ethyl-1,3-propanediol, and preferred components ($u_2$) used comprise 2,3-dimethyl-2,3-butanediol and 2,5-dimethyl-2,5-hexanediol. As component ($a_1$) [sic] it is particularly preferred to use 2-butyl-2-ethyl-1,3-propanediol and also 2-phenyl-2-ethyl-1,3-propanediol, and as component ($u_2$) it is particularly preferred to use 2,5-dimethyl-2,5-hexanediol.

The diols ($u_1$) and/or ($u_2$) are usually used in an amount of from 0.5 to 15% by weight, preferably from 1 to 7% by weight, based in each case on the overall weight of the synthesis components used to prepare the polyurethane resins (a113).

Typical polyfunctional isocyanates used to prepare the polyurethane resins (a113) are aliphatic, cycloaliphatic and/or aromatic polyisocyanates containing at least two isocyanate groups per molecule. Preference is given to the isomers or isomer mixtures of organic diisocyanates. Owing to their good resistance to ultraviolet light, (cyclo)aliphatic diisocyanates give products having little tendency to yellow. The polyisocyanate component used to form the prepolymer may also include a fraction of polyisocyanates of higher functionality, provided that this does not cause any gelling. Products which have established themselves as triisocyanates are those formed by trimerization or oligomerization of diisocyanates or by reaction of diisocyanates with polyfunctional compounds containing OH or NH groups. The average functionality may be reduced if desired by adding monoisocyanates.

Examples of polyisocyanates that may be used include phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate, cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate.

To prepare high-solids polyurethane resin solutions (b13) use is made in particular of diisocyanates of the general formula 3

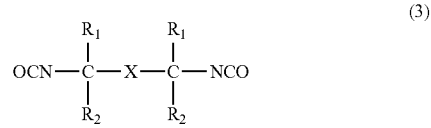

where X is a divalent, aromatic hydrocarbon radical, preferably an optionally halogen-, methyl- or methoxy-substituted naphthylene, diphenylene or 1,2-, 1,3- or 1,4-phenylene radical, with particular preference a 1,3-phenylene radical, and $R_1$ and $R_2$ are an alkyl radical having 1-4 carbon atoms, preferably a methyl radical. Diisocyanates of the general formula 3 are known (their preparation is described, for example, in EP-A-101 832, U.S. Pat. No. 3,290,350, U.S. Pat. No. 4,130,577, and U.S. Pat. No. 4,439,616) and some are available commercially (1,3-bis(2-isocyanatoprop-2-yl)benzene, for example, is sold by the American Cyanamid Company under the tradename TMXDI (META)®).

Further preferred polyisocyanate compounds include diisocyanates of the formula 4:

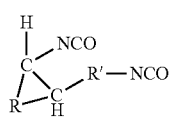

(4)

where: R is a divalent alkyl or aralkyl radical having from 3 to 20 carbon atoms, and R' is a divalent alkyl or aralkyl radical having from 1 to 20 carbon atoms;

especially 1-isocyanato-2-(3-isocyanatoprop-1-yl)cyclohexane.

Polyurethanes generally speaking are incompatible with water unless specific constituents are incorporated and/or particular preparation steps performed in the case of their synthesis. For preparing the polyurethane resins (a113), then, it is possible to use compounds which contain at least two isocyanate-reactive H-active groups and at least one group which ensures dispersibility in water. Suitable such groups are the above-described nonionic groups (iii) (e.g., polyethers), the above-described anionic groups (ii), mixtures of these two groups, or the above-described cationic groups (i).

Accordingly it is possible to incorporate into the polyurethane resin (a113) an acid number which is sufficiently great that the neutralized product can be dispersed stably in water. Compounds useful for this purpose contain at least one isocyanate-reactive group and at least one group (ii) capable of forming anions. Suitable isocyanate-reactive groups are, in particular, hydroxyl groups and also primary and/or secondary amino groups. Groups (ii) capable of forming anions are carboxyl, sulfonic acid and/or phosphonic acid groups. It is preferred to use alkanoic acids having two substituents on the alpha carbon atom. The substituent may be a hydroxyl group, an alkyl group or an alkylol group. These polyols have at least one, generally from 1 to 3, carboxyl groups in the molecule. They have from 2 to about 25, preferably from 3 to 10, carbon atoms. The polyol containing carboxyl groups (ii) may account for from 3 to 100% by weight, preferably from 5 to 50% by weight, of the overall polyol constituent in the NCO prepolymer.

The amount of ionizable carboxyl groups (ii) that is available as a result of the carboxyl group neutralization in salt form is generally at least 0.4% by weight, preferably at least 0.7% by weight, based on the solids. The upper limit is approximately 12% by weight. The amount of dihydroxyalkanoic acids in the unneutralized prepolymer results in an acid number of at least 5 mg KOH/g, preferably at least 10 mg KOH/g.

At very low acid numbers, it is generally necessary to take further measures to obtain dispersibility in water, for instance by nonionic stabilization with the aid of the above-described functional groups (iii). The upper limit on the acid number is 150 mg KOH/g, preferably 40 mg KOH/g, based on the solids. Preferably, the acid number is situated within the range from 20 to 40 mg KOH/g.

The isocyanate groups of the isocyanato-containing prepolymer are reacted with a modifier or chain extender. The modifier in this case is preferably added in an amount such that the result is chain extensions and hence increases in molecular weight. Modifiers used are preferably organic compounds containing hydroxyl and/or secondary and/or primary amino groups, in particular polyols and/or polyamines having a functionality of two, three and/or more. Examples of polyamines which can be used include ethyelenediamine, trimethylenediamine, tetramethylenediamine, pentamethylenediamine, hexamethylenediamine, and diethylenetriamine. Examples of polyols which can be used include trimethylolpropane, 1,3,4-butanetriol, glycerol, erythritol, mesoerythritol, arabitol, adonitol, etc. It is preferred to use trimethylolpropane.

The polyurethane resins (a113) for use in accordance with the invention may be grafted with ethylenically unsaturated compounds. Examples of suitable polyurethane resins (a113) for use in accordance with the invention and present in the form of graft copolymers are known from the patents EP-A-0 424 705, EP-A-0 521 928, EP-A-0 522 420, EP-A-0 522 419, and EP-A-0 730 613.

To prepare the polyurethane resin (a113) it is preferred first to prepare an isocyanato-containing prepolymer from which the desired polyurethane resin (a113) is then prepared by further reaction, preferably chain extension. The components are reacted in accordance with the well-known techniques of organic chemistry (cf., e.g., Kunststoff Handbuch, volume 7, Polyurethane, edited by Dr. Y. Oertel, Carl Hanser Verlag, Munich, Vienna 1983). Examples of the preparation of the prepolymers are described in DE-A-26 24 442 and DE-A-32 10 051. The polyurethane resins (a113) can be prepared in accordance with the known techniques (e.g., acetone process) or by graft copolymerization, as described in the patents EP-A-0 424 705, EP-A-0 521 928, EP-A-0 522 420, EP-A-0 522 419, and EP-A-0 730 613.

The components are preferably reacted in the customary and known organic solvents. The amount of organic solvents in this case may vary within wide limits and should be sufficient to form a prepolymer solution of appropriate viscosity. In general up to 70% by weight, preferably from 5 to 50% by weight, and with particular preference less than 20% by weight of solvents, based on the solids, are employed. Accordingly, for example, the reaction may with very particular preference be conducted at a solvent content of 10-15% by weight, based on the solids.

The reaction of the components may if desired take place in the presence of a catalyst, such as organotin compounds and/or tertiary amines.

To prepare the prepolymers, the amounts of the components are chosen such that the equivalents ratio of NCO groups to OH groups is between 2.0:1.0 and >1.0:1.0, preferably between 1.4:1 and 1.1:1.

The NCO prepolymer contains at least about 0.5% by weight of isocyanate groups, preferably at least 1% by weight of NCO, based on the solids. The upper limit is situated at approximately 15% by weight, preferably 10% by weight, with particular preference at 5% by weight of NCO.

The water-soluble or -dispersible binders (a11) for use in accordance with the invention may be present individually or as mixtures.

If they are to be used in a mixture, care should be taken to be sure not to combine binders (11) [sic] containing functional groups (i) with binders (a11) containing functional groups (ii), since this may lead to the formation of insoluble polyelectrolyte complexes.

The further key constituent of the base color (a1) is at least one customary paint pigment (a12). In this context it is possible to use not only the pigments customary in aqueous coating compositions, which do not react with water and/or do not dissolve in water, but also the pigments commonly employed in conventional coating compositions. The pigments may consist of inorganic or organic compounds and may impart effect and/or color. Owing to this large number of suitable pigments, therefore, the coating material of the invention ensures a universal breadth of use of the coating materials and allows the realization of a large number of color shades and optical effects.

As effect pigments (a12), it is possible to use metal flake pigments such as commercially customary aluminum bronzes, aluminum bronzes chromated in accordance with DE-A-36 36 183, and commercially customary stainless steel bronzes, and also nonmetallic effect pigments, such as pearlescent pigments and interference pigments, for example.

Examples of suitable inorganic color pigments are titanium dioxide, iron oxides, Sicotrans yellow, and carbon black.

Examples of suitable organic color pigments are indanthrene blue, Cromophthal red, Irgazine orange, and Heliogen green.

The pigments (a12) may be used together with appropriate fillers (a12). It is, however, also possible to use suitable fillers (a12) instead of pigments (a12), provided they possess the appropriate hiding power. Examples of suitable fillers are chalk, calcium sulfates, barium sulfate, silicates such as talc or kaolin, silicas, oxides such as aluminum hydroxide or magnesium hydroxide, nanoparticles, or organic fillers such as textile fibers, cellulose fibers, polyethylene fibers or wood flour.

The further key constituent of the base color (A1) is at least one organic solvent (a13), which may also be water-miscible.

Examples of suitable organic solvents (a13) are esters, ketones such as acetone or methyl isobutyl ketone, keto esters, glycol ethers such as ethylene, propylene or butylene glycol ethers, glycol esters such as ethylene, propylene or butylene glycol esters, or glycol ether esters such as ethoxyethyl propionate, or amides such as N-methylpyrrolidone or N,N-dimethylacetamide.

Further examples of suitable organic solvents (a13) are those known as reactive diluents, which may participate in the reaction with the crosslinking agents (a14), (a25) and/or (b3) described below.

Examples of suitable thermally crosslinkable reactive diluents (a13) are branched, cyclic and/or acyclic $C_9$-$C_{16}$ alkanes which are functionalized with at least two hydroxyl groups, preferably dialkyloctanediols, in particular the positionally isomeric diethyl-octanediols.

Further examples of suitable thermally crosslinkable reactive diluents (a13) are oligomeric polyols which are obtainable from oligomeric intermediates, themselves obtained by metathesis reactions of acyclic monoolefins and cyclic monoolefins, by hydroformylation and subsequent hydrogenation; examples of suitable cyclic monoolefins are cyclobutene, cyclopentene, cyclohexene, cyclooctene, cycloheptene, norbonene [sic] or 7-oxanorbonene [sic]; examples of suitable acyclic monoolefins are present in hydrocarbon mixtures obtained in petroleum processing by cracking ($C_5$ cut); examples of suitable oligomeric polyols for inventive use have a hydroxyl number (OHN) of from 200 to 450, a number-average molecular weight Mn of from 400 to 1000, and a mass-average molecular weight Mw of from 600 to 1100.

Further examples of suitable thermally crosslinkable reactive diluents (a13) are hyperbranched compounds having a tetrafunctional central group, derived from ditrimethylolpropane, diglycerol, ditrimethylolethane, pentaerythritol, tetrakis(2-hydroxyethyl)methane, tetrakis(3-hydroxypropyl)methane or 2,2-bishydroxymethyl-1,4-butanediol (homopentaerythritol). These reactive diluents may be prepared in accordance with the customary and known methods of preparing hyperbranched and dendrimeric compounds. Suitable synthesis methods are described, for example, in the patents WO 93/17060 or WO 96/12754 or in the book by G. R. Newkome, C. N. Moorefield and F. Vogtle, "Dendritic Molecules, Concepts, Syntheses, Perspectives", VCH, Weinheim, N.Y., 1996.

Further examples of suitable reactive diluents (a13) are polycarbonatediols, polyesterpolyols, poly(meth)acrylatediols or hydroxyl-containing polyaddition products.

Examples of suitable reactive solvents (a13) are butyl glycol, 2-methoxypropanol, n-butanol, methoxybutanol, n-propanol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate or 3-methyl-3-methoxybutanol and also derivatives based on propylene glycol, e.g., ethoxyethyl propionate, isopropoxypropanol or methoxypropyl acetate.

Of the abovementioned solvents and reactive diluents (a13), the water-miscible ones are of advantage in accordance with the invention and are therefore used with preference.

The base color (A1) may further comprise crosslinking agents (a14); it is important that the crosslinking agents (a14) do not adversely affect the storage stability of the base color (A1), by premature crosslinking, for instance. The skilled worker will therefore be able to select, simply, the appropriate combinations of crosslinking agents (a14) on the one hand and binders (a11) on the other.

Examples of suitable crosslinking agents (a14) are blocked diisocyanates and/or polyisocyanates.

Examples of suitable diisocyanates and/or polyisocyanates for preparing the blocked derivatives (a14) are organic polyisocyanates, especially so-called paint polyisocyanates, containing free isocyanate groups attached to aliphatic, cycloaliphatic, araliphatic and/or aromatic moieties. Preference is given to polyisocyanates containing 2 to 5 isocyanate groups per molecule and having viscosities of from 100 to 10,000, preferably from 100 to 5000, and in particular from 100 to 2000 mPas (at 23° C.). If desired, small amounts of organic solvent, preferably from 1 to 25% by weight based on straight polyisocyanate, may be added to the polyisocyanates in order thus to improve the ease of incorporation of the isocyanate and, if appropriate, to lower the viscosity of the polyisocyanate to a level within the abovementioned ranges. Examples of solvents suitable as addives the [sic] polyisocyanates are ethoxyethyl propionate, amyl methyl ketone, and butyl acetate. Additionally, the polyisocyanates may have been hydrophilically or hydrophobically modified in a conventional manner.

Examples of suitable polyisocyanates are described, for example, in "Methoden der organischen Chemie", Houben-Weyl, volume 14/2, 4th Edition, Georg Thieme Verlag, Stuttgart 1963, pages 61 to 70, and by W. Siefken, Liebigs Annalen der Chemie, volume 562, pages 75 to 136. Suitable examples include the isocyanato-containing polyurethane prepolymers, which may be prepared by reacting polyols with an excess of polyisocyanates and which are preferably of low viscosity.

Further examples of suitable polyisocyanates are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example. Preference is given to the use of aliphatic or cycloaliphatic polyisocyanates, especially hexamethylene diisocyanate, dimerized and trimerized hexamethylene diisocyanate, isophorone diisocyanate, 2-isocyanato-propylcyclohexyl isocyanate, dicyclohexylmethane 2,4'-diisocyanate, dicyclohexylmethane 4,4'-diisocyanate or 1,3-bis(isocyanatomethyl)cyclohexane, diisocyanates derived from dimeric fatty acids as sold under the commercial designation DDI 1410 by the company Henkel, 1,8-diisocyanato-4-isocyanatomethyl octane, 1,7-diisocyanato-4-isocyanatomethyl heptane or 1-isocyanato-2-(3-isocyanatopropyl)cyclohexane, or mixtures of these polyisocyanates.

Examples of suitable blocking agents are the blocking agents known from the U.S. Pat. No. 4,444,954, such as
i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;
ii) lactams, such as ϵ-caprolactam, δ-valerolactam, γ-butyrolactam or β-propiolactam;
iii) active methylenic compounds, such as diethyl malonate, dimethyl malonate, ethyl or methyl acetoacetate, or acetylacetone;
iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;
v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;
vi) acid amides such as acetoanilide, acetoanisidinamide, acrylamide, methacrylamide, acetamide, stearamide or benzamide;
vii) imides such as succinimide, phthalimide or maleimide;
viii) amines such as diphenylamine, phenylnaphthylamine, xylidine, N-phenylxylidine, carbazole, aniline, naphthylamine, butylamine, dibutylamine or butyl-phenylamine;
ix) imidazoles such as imidazole or 2-ethylimidazole;
x) ureas such as urea, thiourea, ethyleneurea, ethylenethiourea or 1,3-diphenylurea;
xi) carbamates such as phenyl N-phenylcarbamate or 2-oxazolidone;
xii) imines such as ethyleneimine;
xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;
xiv) salts of sulfurous acid such as sodium bisulfite or potassium bisulfite;
xv) hydroxamic esters such as benzyl methacrylohydroxamate (BMH) or allyl methacrylohydroxamate; or
xvi) substituted pyrazoles, ketoximes, imidazoles or triazoles; and also
mixtures of these blocking agents, especially dimethylpyrazole and triazoles, malonic esters and acetoacetic esters or dimethylpyrazole and succinimide.

Further examples of suitable crosslinking agents (a14) are polyepoxides (a14), in particular all known aliphatic and/or cycloaliphatic and/or aromatic polyepoxides, based for example on bisphenol A or bisphenol F. Also suitable as polyepoxides (a14), for example, are the polyepoxides obtainable commercially under the designations Epikote® from Shell, Denacol© from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether).

As crosslinking agents (a14) it is also possible to use tris (alkoxycarbonylamino)triazines of the general formula 5 [sic]

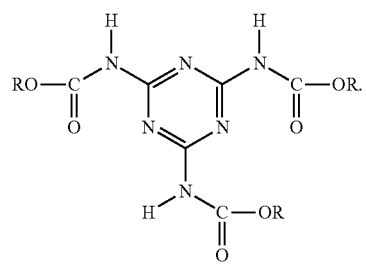

Examples of suitable tris(alkoxycarbonylamino)triazines (a14) are described in the U.S. Pat. No. 4,939,213, U.S. Pat. No. 5,084,541 and EP-A-0 624 577. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

Especially suitable for use as crosslinking agents (a14) are amino resins, examples being melamine resins. In this instance, use can be made of any amino resin suitable for transparent topcoats or clearcoats, or of a mixture of such amino resins. Especially suitable are the customary and known amino resins some of whose methylol and/or methoxymethyl groups have been defunctionalized by means of carbamate or allophanate groups. Crosslinking agents of this kind are described in the U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207. The amino resins may furthermore be used also as binders (a11) in the base color (A1).

Further examples of suitable crosslinking agents (a14) are beta-hydroxyalkylamides such as N,N,N',N'-tetrakis(2-hydroxyethyl)adipamide or N,N,N',N'-tetrakis(2-hydroxypropyl)adipamide.

Further examples of suitable crosslinking agents (a14) are siloxanes, especially siloxanes containing at least one trialkoxy- or dialkoxysilane group.

Further examples of suitable crosslinking agents (a14) are polyanhydrides, especially polysuccinic anhydride.

The base color (A1) may further comprise at least one auxiliary and/or additive (a15) as customary and known in the field of coating materials and paints. They are generally referred to by the skilled worker as coatings additives.

Examples of suitable coatings additives (a15) are
UV absorbers;
free-radical scavengers;
crosslinking catalysts;
slip additives;
polymerization inhibitors;
defoamers;

emulsifiers, especially nonionic emulsifiers such as alkoxylated alkanols and polyols, phenols and alkylphenols or anionic emulsifiers such as alkali metal salts and ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and copolymers thereof, or polyurethanes;

adhesion promoters;

leveling agents;

film formation auxiliaries such as cellulose derivatives;

flame retardants or photoinitiators, such as photoinitiators of the Norrish II type, whose mechanism of action is based on an intramolecular variant of the hydrogen abstraction reactions as occur diversely in photochemical reactions (by way of example, reference may be made here to Römpp Chemie Lexikon, $9^{th}$, expanded and revised edition, Georg Thieme Verlag, Stuttgart, Vol. 4, 1991) or cationic photoinitiators (by way of example, reference may be made here to Römpp Lexikon Lacke and Druckfarben, Georg Thieme Verlag Stuttgart, 1998, pages 444 to 446); and also, if desired the rheology control additives described below.

Further examples of suitable coatings additives (a15) are described in the textbook "Lackadditive" [Additives for coatings] by Johan Bieleman, Wiley-VCH, Weinheim, N.Y., 1998.

The base color (A1) may further comprise constituents (a16) which are curable with actinic radiation, especially UV radiation and/or electron beams. This offers the advantage that the coating materials of the invention are curable both physically or thermally and in addition are also radiation curable.

In the context of the present invention, the term "physical curing" denotes the curing of a coat of a coating material by filming, where appropriate after drying of the coat. Normally, no crosslinking agents are required for this purpose. Where appropriate, physical curing may be assisted by atmospheric oxygen or by exposure to actinic radiation.

In the context of the present invention, the term "thermal curing" denotes the heat-initiated curing of a coat of a coating material, where normally a separate crosslinking agent is employed. This is commonly referred to by those in the art as external crosslinking. Where the crosslinking agents are already incorporated in the binders, the term self-crosslinking is also used.

In the context of the present invention, actinic radiation means electron beams or, preferably, UV radiation. Curing by UV radiation is normally initiated by the above-described free-radical or cationic photoinitiators.

Where thermal curing and curing with actinic light are employed together for a coating material, the term "dual cure" is also used.

Suitable constituents (a16) include in principle all low molecular mass, oligomeric and polymeric compounds that are curable with actinic radiation, especially UV radiation and/or electron beams, said compounds being as commonly used in the field of UV curable or electron beam curable coating compositions. These radiation curable coating compositions normally include at least one, preferably two or more, radiation curable binders, based in particular on ethylenically unsaturated prepolymers and/or ethylenically unsaturated oligomers, one or more reactive diluents, where appropriate, and also one or more photoinitiators, where appropriate.

Advantageously, the radiation curable binders as used as constituents (a16). Examples of suitable radiation curable binders (a16) are (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders (a16) that are free from aromatic structural units. Preference is therefore given to using urethane (meth)acrylates and/or polyester (meth)acrylates, and particular preference to using aliphatic urethane acrylates.

Further examples of suitable radiation curable constituents (a16) are reactive diluents, especially low molecular mass, polyfunctional, ethylenically unsaturated ones. Examples of highly suitable compounds of this kind are esters of acrylic acid with polyols, such as neopentyl glycol diacrylate, trimethylolpropane triacrylate, pentaerythritol triacrylate or pentaerythritol tetraacrylate; or reaction products of hydroxyalkyl acrylates with polyisocyanates, especially aliphatic polyisocyanates.

In accordance with the invention it is of advantage if the base color (A1) to be used in accordance with the invention comprises (a12) from 0.5 to 70% by weight of at least one effect pigment and/or at least one color pigment, (a11) from 10 to 80% by weight of at least one water-dilutable or water-dispersible binder, and (a13) from 10 to 89.5% by weight of at least one organic solvent, the sum of the weight fractions in components (a11) to (a13) being in each case 100% by weight.

For the modular system of the invention it is of advantage, furthermore, if the base colors (A1) contain only effect pigments or only color pigments. As already stated above, however, the modular system of the invention must always include at least one base color (A1) which comprises at least one color pigment.

Particularly preferred base colors (A1) on the basis of effect pigments comprise (a12) from 0.5 to 50% by weight of at least one effect pigment, (a11) from 20 to 80% by weight of at least one water-dilutable or water-dispersible binder, and (a13) from 10 to 79.5% by weight of at least one organic solvent, the sum of the weight fractions of the constituents (a11) to (a13) being in each case 100% by weight.

Particularly preferred base colors (A1) on the basis of inorganic color pigments (a12) comprise (a12) from 1 to 70% by weight of at least one inorganic color pigment, (a11) from 10 to 80% by weight of at least one water-dilutable or water-dispersible binder, and (a13) from 10 to 89% by weight of at least one organic solvent, the sum of the weight fractions of the components (a11) to (a13) being in each case 100% by weight.

Particularly preferred base colors (A1) on the basis of organic color pigments comprise (a12) from 1 to 30% by weight of at least one organic color pigment, (a11) from 10 to 80% by weight of at least one water-dilutable or water-dispersible binder, and (a13) from 10 to 89% by weight of at least one organic solvent, the sum of the weight fractions of the components (a11) to (a13) being in each case 100% by weight.

It is of course also possible to use base colors (A1) comprising a combination of at least one organic color pigment and at least one inorganic color pigment.

The base color (A1) may further contain from 0 to 50% by weight, based on the overall weight, of crosslinking agents (a14), coating additives (a15) and/or radiation curable constituents (a16).

Viewed in terms of its method, the preparation of the base color (A1) has no special features but instead takes place in accordance with the customary and known methods of preparing pigmented coating materials.

The further key constituent of the modular system of the invention is at least one aqueous color module (II).

The aqueous color module (II) comprises at least one aqueous color-imparting base color (A2).

The base color (A2) comprises as a key constituent at least one water-soluble or -dispersible binder (a21). Suitable binders (a21) include all of the above-described binders (a11). In accordance with the invention it is of advantage if the binders used in the base color (A2) are the same as those used in the base color (A1) [(a11)=(a21)]. In accordance with the invention, the above-described polyurethane resins (a113) are of particular advantage in this context and are therefore used with particular preference.

The base color (A2) further comprises at least one color pigment (a22). Examples of suitable color pigments (a22) are the above-described color pigments (a12).

The base color (A2) additionally comprises, as a further key constituent (a23), water.

Additionally, the base color (A2) may comprise at least one water-miscible organic solvent (a24). Examples of suitable solvents (a24) are the above-described solvents (a13). In accordance with the invention it is of advantage if the solvents used in the base color (A2) are the same as those used in the base color (a1) [sic] [(a13)=(a24)].

The base color (A2) may further comprise at least one crosslinking agent (a25). Examples of suitable crosslinking agents (a25) are the above-described crosslinking agents (a14). In accordance with the invention it is of advantage if the crosslinking agents used in the base color (A2) are the same as those used in the base color (A1) [(a14)=(a25)].

The base color (A2), moreover, may comprise at least one coatings additive (a26). Examples of suitable coatings additives (a26) are the above-described coatings additives (a15). In accordance with the invention it is of advantage if the coatings additives used in the base color (A2) are the same as those used in the base color (A1) [(a15)=(a26)].

Not least, the base color (A2) may comprise at least one radiation curable constituent (a27). Examples of suitable radiation curable constituents (a27) are the above-described radiation curable constituents (a16). In accordance with the invention it is of advantage if the radiation curable constituents used in the base color (A2) are the same as those used in the base color (A1) [(a16)=(a27)].

Particularly preferred base colors (A2) on the basis of inorganic color pigments (a22) comprise
- (a22) from 1 to 70% by weight of at least one inorganic color pigment and
- (a21) from 10 to 80% by weight of at least one water-dilutable or water-dispersible binder,
- (a23) from 89 to 20% by weight of water, and
- (a24) from 0 to 20% by weight of at least one organic solvent, the sum of the weight fractions of components (a21) to (a24) being in each case 100% by weight.

Particularly preferred base colors (A2) on the basis of organic color pigments comprise
- (a22) from 1 to 30% by weight of at least one organic color pigment and
- (a21) from 10 to 80% by weight of at least one water-dilutable or water-dispersible binder,
- (a23) from 89 to 10% by weight of water, and
- (a24) from 0 to 20% by weight of at least one organic solvent, the sum of the weight fractions of components (a21) to (a24) being in each case 100% by weight.

It is of course also possible to use base colors (A2) comprising a combination of at least one organic color pigment and at least one inorganic color pigment.

The base color (A2) may further contain from 0 to 50% by weight, based on the overall weight, of organic solvents (a24), crosslinking agents (a25), coating additives (a26) and/or radiation curable constituents (a27).

Viewed in terms of its method, the preparation of the base color (A2) likewise has no special features but instead takes place in accordance with the customary and known methods of preparing pigmented coating materials by milling of their constituents in appropriate mills such as bead mills or ball mills.

The third key constituent of the modular system of the invention is at least one aqueous, pigment-free mixing varnish module (III).

The mixing varnish module (III) for use in accordance with the invention comprises at least one aqueous, pigment-free mixing varnish (B).

The first key constituent of the mixing varnish (B) is at least one water-soluble or -dispersible binder (b1). Examples of suitable binders (b1) are the binders (a11) described in detail above. In accordance with the invention it is of advantage if the binders used in the mixing varnish (B) are the same as those used in the base color (A1) and/or (A2) [(b1)=(a11) and/or (a21)].

The further key constituent (b2) of the mixing varnish (B) is water.

The mixing varnish (B) may further comprise at least one crosslinking agent (b2). Examples of suitable crosslinking agents (b2) are the above-described crosslinking agents (a14) and/or (a25). In accordance with the invention it is of advantage if the crosslinking agents used in the mixing varnish (B) are the same as those used in the base color (A1) and/or the base color (A2) [(b3)=(a14) and/or (a25)].

The mixing varnish (B), moreover, may comprise at least one coatings additive (b4). Examples of suitable coatings additives (b4) are the above-described coatings additives (a15) and/or (a26). In accordance with the invention it is of advantage if the coatings additives used in [lacuna] are the same as those used in the base color (A1) and/or the base color (A2) [(b4)=(a15) and/or (a26)].

The mixing varnish (B) may further comprise at least one radiation curable constituent (b5). Examples of suitable radiation curable constituents (b5) are the above-described radiation curable constituents (a16) and/or (a27). In accordance with the invention it is of advantage if the radiation curable constituents used in the mixing varnish (B) are the same as those used in the base color (A1) and/or the base color (A2) [(b5)=(a16) and/or (a27)].

Not least, the mixing varnish (B) may comprise at least one water-miscible organic solvent (b6) in minor amounts. In the context of the present invention, the phrase "minor amount" means that the mixing varnish (B) contains organic solvents (b6) only in an amount such that the aqueous nature of the mixing varnish (B) is not lost.

Examples of suitable solvents (b6) are the solvents (a13) and/or (a24) described in detail above. In accordance with the invention it is of advantage if the solvents (b6) used in the mixing varnish (B) are the same as those used in the base colors (A1) and/or (A2) [(b6)=(a13) and/or (a24)].

Particularly preferred mixing varnishes (B) comprise
(b1) from 10 to 80% by weight of at least one binder (b1) and
(b2) from 20 to 90% by weight of water,
the sum of the weight fractions of the constituents (b1) and (b2) being in each case 100% by weight.

The mixing varnish (B) may further comprise from 0 to 50% by weight, based on the overall weight, of organic solvents (b6), crosslinking agents (b3), coatings additives (b4) and/or radiation curable constituents (b5).

Viewed in terms of its method, the preparation of the mixing varnish (B) has no special features but instead takes place in accordance with the customary and known methods of preparing varnishes using customary and known mixing equipment such as stirred tanks or dissolvers.

As a fourth constituent of the modular system of the invention it is possible to use at least one pigment-free rheology module (IV).

The first key constituent of the rheology module (IV) is an aqueous medium (C).

The aqueous medium (C) consists essentially of water. In this context, the aqueous medium (C) may include minor amounts of the above-detailed constituents of the base colors (A1) and/or (A2), except for the pigments (a12) and (a22), and of the mixing varnish (B), and/or other solid, liquid or gaseous, organic and/or inorganic, low and/or high molecular mass substances, in molecularly disperse solution or dispersion. In the context of the present invention, the term "minor amount" means an amount which does not remove the aqueous character of the aqueous medium (C).

In accordance with the invention, the aqueous medium (C) comprises at least one rheology control additive (c1).

Examples of suitable rheology control additives (c1) are those known from the patents WO 94/22968, EP-A-0 276 501, EP-A-0 249 201, and WO 97/12945; crosslinked polymeric microparticles, as disclosed for example in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils; or synthetic polymers containing ionic and/or associative groups, such as polyvinyl alcohol, poly (meth)acrylamide, poly(meth)acrylic acid, polyvinylpyrrolidone, styrene-maleic anhydride or ethylene-maleic anhydride copolymers and their derivatives, or hydrophobically modified, ethoxylated urethanes or polyacrylates. As rheology control additives it is preferred to use phyllosilicates.

As already remarked above, these rheology control additives (c1) may also be present as coatings additives (a15) in the base color (A1), as coatings additives (a26) in the base color (A2) and/or as coatings additive (b4) in the mixing varnish (B), but in particular as a coatings additive (b4) in the mixing varnish (B). In accordance with the invention it is of advantage if the rheology control additives (c1) are present substantially or exclusively in the pigment-free rheology module (IV).

In the pigment-free rheology module (IV), advantageously, the aqueous medium (C) is present in an amount of from 50 to 99.5% by weight, preferably from 70 to 99% by weight, and in particular from 75 to 98.5% by weight, and the rheology control additive (c1) is present in an amount of from 0.5 to 50% by weight, preferably from 1.0 to 30% by weight, and in particular from 1.5 to 25% by weight, based in each case on the total amount of the rheology module (IV).

Viewed in terms of its method, the preparation of the rheology module (IV) has no special features but instead takes place in accordance with the customary and known methods of preparing coating materials using customary and known mixing equipment such as stirred tanks or dissolvers.

To prepare the coating materials of the invention, the different base colors (A1) of the color and/or effect module (I), the different base colors (A2) of the color module (II), the mixing varnish (B) of the mixing varnish module (III), and the rheology module (IV) are mixed in a ratio such that application of said coating materials results in coatings of the invention having the particular desired shade and/or optical effect. The mixing ratio of the aforementioned constituents is determined by the requirement that the resultant coating material, irrespective of its shade, have the desired viscosity and solids content and contain the desired amount of organic solvents, etc.

The solids content (amount of binders (a11), (a21), and (b1) used plus the amount of pigment (a12) and (a22) used] and also the amount of organic solvents, etc., varies with the intended use of the coating materials of the invention.

For their use for automotive refinish, the solids content for metallic effect coating materials is preferably from 7 to 25% by weight and for solid-color topcoat materials is preferably from 10 to 45% by weight, based in each case on the total weight of the coating material of the invention.

One preferred embodiment of the modular system of the invention is a mixer system in which all base colors (A1) and (A2) and the mixing varnish (B) comprise the same binder, or the same binders in the case of a binder mixture. This ensures that—irrespective of the mixing ratio of the different base colors (A1) and (A2) and of the mixing varnish (B) and hence irrespective of shade and/or optical effect—the resultant mixtures of the different base colors (A1) and (A2) and of the mixing varnish (B) exhibit an approximately consistent evaporation behavior (drying) and also similar rheology. It also ensures that, when using different base colors (A1) and (A2) and mixing varnish (B), consistent film properties are obtained independently of the particular desired color shade.

Where a mixture of different binders is used in each case in the base colors (A1) and (A2) and in the mixing varnish (B), the mixing ratio of the different binders to one another in the individual base colors (A1) and (A2) and in the mixing varnish (B) should also preferably be constant in each case, in order that, after mixing with the other constituents of the modular system of the invention, consistent mixing ratios between the binders are again achieved irrespective of the shade. Where the rheology module (IV) uses a mixture of the binders which are also used in in [sic] the individual base colors (A1) and (A2) and in the mixing varnish (B), the mixing ratio of the different binders to one another in the rheology module (IV) should also preferably be the same as the mixing ratio of these binders in the individual base colors (A1) and (A2) and in the mixing varnish (B).

Particularly preferred modular systems of the invention are obtained if the individual base colors (A1) and (A2) and the mixing varnish (B) and also, where appropriate, the rheology module (IV) comprise water-dilutable polyethane resins (a113) as binders.

The coating composition of the invention prepared with the aid of the modular system of the invention is physically curable, thermally curable, curable physically and with actinic radiation, and also curable thermally and with actinic radiation. In accordance with the invention, physical curing is of advantage, especially if the coating composition of the invention is to be used for automotive refinish or for painting plastics.

The coating materials of the invention prepared using the modular system of the invention may be applied to a very wide variety of substrates, such as metal, wood, glass, plastic or paper, for example. In particular, the aqueous coating materials prepared by means of the modular system or mixer system of the invention are suitable for the restorative painting of damage sites, in particular for automotive refinish. In this case, directly following their preparation by mixing of their constituents, the coating compositions of the invention are applied to the appropriately prepared (e.g., by filling and priming) damage site by means of customary methods, especially spraying. Preferably, the aqueous coating materials prepared using the mixer system of the invention are used to produce a basecoat film or a solid-color topcoat film, but in particular a basecoat film.

Following initial drying of the basecoat film thus prepared, at room temperature or by forced drying (e.g., 10 min at 60° C., 80° C. or IR drying), a suitable clearcoat film is applied wet-on-wet for purposes of producing a multicoat color and/or effect coating system.

Coating materials used to prepare clearcoat films by the wet-on-wet technique are customary and known.

Suitable coating materials or clearcoat materials in this context include one-component (1K), two-component (2K) or multicomponent (3K, 4K) clearcoat materials, powder clearcoat materials, powder slurry clearcoat materials, and clearcoat materials curable with actinic radiation.

Examples of suitable one-component (1K), two-component (2K) or multicomponent (3K, 4K) clearcoat materials are known, for example, from the patents DE-A-42 04 518, U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460, and WO 92/22615.

One-component (1K) clearcoat materials comprise, for example, hydroxyl-containing binders and crosslinking agents such as blocked polyisocyanates, tris(alkoxycarbonylamino)triazines and/or amino resins. In another variant, the binders they comprise include polymers containing pendant carbamate and/or allophanate groups, and carbamate- and/or allophanate-modified amino resins.

Two-component (2K) or multicomponent (3K, 4K) clearcoat materials include as key constituents, for example, hydroxyl-containing binders and polyisocyanate crosslinking agents, which are stored separately until the time of their use.

Examples of suitable powder clearcoat materials are known, for example, from the German patent DE-A-42 22 194 or from the BASF Lacke+Farben AG product information leaflet, "Pulverlacke" [powder coating materials], 1990.

Examples of key constituents of powder clearcoat materials are binders containing epoxide groups and polycarboxylic acid crosslinking agents.

Examples of suitable powder slurry clearcoat materials are known, for example, from the U.S. Pat. No. 4,268,542 and from the German patent applications DE-A-195 18 392.4 and DE-A-196 13 547, or are described in the German patent application DE-A-198 14 471.7, which was unpublished at the priority date of the present specification.

Powder slurry clearcoat materials contain, as is known, powder clearcoat materials dispersed in an aqueous medium.

UV curable clearcoat materials are disclosed, for example, by the patents EP-A-0 540 884, EP-A-0 568 967, and U.S. Pat. No. 4,675,234.

They conventionally include low molecular mass, oligomeric and/or polymeric compounds curable with actinic light and/or electron beams, preferably radiation curable binders, based in particular on ethylenically unsaturated prepolymers and/or ethylenically unsaturated oligomers, one or more reactive diluents, where appropriate, and also one or more photoinitiators, where appropriate. Examples of suitable radiation curable binders are (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders that are free from aromatic structural units.

It is, however, also possible to employ multiple clearcoat films, such as, for instance, a clearcoat film based on hydroxyl-containing binders and blocked polyisocyanates and amino resins as crosslinking agents, which lies directly atop the aqueous basecoat film, and atop which there is a further clearcoat film based, for example, on binders containing carbamate and/or allophanate groups and on amino resins as crosslinking agents.

When using two-component (2K) or multicomponent (3K, 4K) clearcoat materials, drying takes place preferably at temperatures of below 100° C., preferably of below 80° C. It is also possible to employ higher temperatures if necessary and/or advantageous in the specific case. The dry film thicknesses of the basecoat film are in particular between 5 and 25 μm, those of the clearcoat film generally between 30 and 70 μm.

When using one-component (1K) clearcoat materials, powder clearcoat materials, and powder slurry clearcoat materials, the basecoat film is dried together with the topcoat film at elevated temperatures, e.g., approximately 120° C. The dry film thicknesses of the clearcoat film here are, in particular, between 30 and 50 μm.

This results in single-coat or multicoat systems of the invention having particularly high hiding power.

INVENTIVE AND COMPARATIVE EXAMPLES

Preparation Example 1

Preparation of a Polyurethane Resin Dispersion 1

A suitable reaction vessel equipped with stirrer, reflux condenser and feed vessel was charged under inert gas with 130.8 parts by weight of a polyester having a number-average molecular weight Mn of 1400, based on a commercially customary unsaturated dimer fatty acid having an iodine number of 10 mg $I_2$/g, a monomer content of max. 0.1% by weight, a trimer content of max. 2% by weight, an acid number of from 195 to 200 mg KOH/g, and a saponification number of from 197 to 202 mg KOH/g, isophthalic acid and hexanediol, and the following were added to this initial charge in succession: 11.7 parts by weight of dimethylolpropionic acid, 2.4 parts by weight of neopentyl glycol, 103.4 parts by weight of methyl ethyl ketone, and 63.1 parts by weight of bis(4-isocyanatocyclohexyl)methane. The resultant reaction mixture was heated at reflux until the isocyanate content was constant. Then 6.1 parts by weight of trimethylolpropane were added to the reaction mixture and heating under reflux was continued until the viscosity was 12 dPas (50% strength solution in N-methylpyrrolidone). Any remaining free isocyanate groups were blocked by adding 3.4 parts by weight of n-butanol. The resultant reaction mixture was subsequently admixed in succession with 6.1 parts by weight of dimethylethanolamine, 42.8 parts by weight of a polypropylene glycol having a number-average molecular weight Mn of 900, and 533.7 parts by weight of deionized water. Removal of the methyl ethyl ketone by vacuum distillation gave a polyurethane resin dispersion which was adjusted to a solids content of 30% by weight using deionized water. The resultant polyurethane resin dispersion 1 had a pH of 7.7.

The polyurethane resin dispersion 1 was used to prepare the pigment-free mixing varnish (B) and as a grinding resin for the aqueous, color-imparting base color (A2).

Preparation Example 2

Preparation of a Polyurethane Resin 2

A suitable reaction vessel equipped with stirrer, reflux condenser and feed vessel was charged under inert gas with 214.7 parts by weight of the polyester described in more detail in preparation example 1, and the following were added to this initial charge in succession: 19.2 parts by weight of dimethylolpropionic acid, 4.0 parts by weight of neopentyl glycol, 169.7 parts by weight of methyl ethyl ketone, and 103.6 parts by weight of bis(4-isocyanatocyclohexyl)methane. The resultant reaction mixture was heated at reflux until the isocyanate content was constant. Then 10 parts by weight of trimethylolpropane were added to the reaction mixture and heating under reflux was continued until the viscosity was 10 dPas (50% strength solution in N-methylpyrrolidone). After that there were 452.4 parts by weight of butyl glycol to be added. Removal of the methyl ethyl ketone by vacuum distillation was followed by neutralization of the resin solution with 11.7 parts by weight of dimethylethanolamine and adjustment of its solids content to 44% using butyl glycol.

The polyurethane 2 was used as a binder for preparing the color- and effect-imparting base color (A1).

Preparation Example 3

Preparation of a Polyurethane Resin 3

A suitable reaction vessel equipped with stirrer, reflux condenser and feed vessel was charged under inert gas with 280.2 parts by weight of a polyester having a number-average molecular weight Mn of 1350, based on a commercially customary unsaturated dimer fatty acid having an iodine number of 10 mg $I_2$/g, a monomer content of max. 0.1% by weight, a trimer content of max. 2% by weight, an acid number of from 195 to 200 mg KOH/g, and a saponification number of from 197 to 202 mg KOH/g, isophthalic acid, neopentyl glycol, and hexanediol, and the following were added to this initial charge in succession: 24.4 parts by weight of dimethylolpropionic acid, 4.0 parts by weight of neopentyl glycol, 218.4 parts by weight of methyl ethyl ketone, and 123.1 parts by weight of tetramethylxylylidene diisocyanate. The resultant reaction mixture was heated at reflux until the isocyanate content was constant. Then 18.5 parts by weight of trimethylolpropane were added to the mixture and heating under reflux was continued until the viscosity was 4.0 dPas (10 parts by weight of reaction mixture in 6 parts by weight of N-methylpyrrolidone). After that there were psi 276.9 parts by weight of butyl glycol to be added. Removal of the methyl ethyl ketone by vacuum distillation was followed by neutralization of the resin solution with 13.0 parts by weight of dimethylethanolamine in 30 parts by weight of butyl glycol and adjustment of its solids content to 60% using butyl glycol.

The polyurethane resin 3 was used for preparing a water-free color-imparting base color (A1).

Preparation Example 4

Preparation of the Pigment-Free Mixing Varnish (B)

527 parts by weight of the polyurethane resin dispersion 1 from preparation example 1 were admixed with 362.5 parts by weight of denionized water and 0.25 part by weight of a commercially customary thickener based on polyurethane. The result was the pigment-free mixing varnish (B).

Preparation Example 5

Preparation of the Rheology Module (IV)

32.5 parts by weight of a preswollen aqueous paste containing 1.5 parts by weight of an inorganic sodium-magnesium phyllosilicate thickener and 1 part by weight of polypropylene glycol having a number-average molecular weight of 900 were admixed with 67.5 parts by weight of deionized water, with stirring. The result was the rheology module (IV).

Preparation Example 6

Preparation of a Green-Pigmented Aqueous Base Color (A2)

20 parts by weight of Heliogen green were mixed with 72 parts by weight of the polyurethane resin dispersion 1 from preparation example 1, 4 parts by weight of butyl glycol and 4 parts by weight of a commercially customary dispersing assistant based on a high molecular mass block copolymer, with stirring, and the mixture was dispersed using a bead mill. The result was the aqueous base color (A2). The degree of pigmentation was determined by the desired flow behavior and the desired rheology.

Preparation Example 7 (Comparative Example)

Preparation of a Green-Pigmented Aqueous Base Color (A1)

14 parts by weight of Heliogen green were mixed with 44.8 parts by weight of the polyurethane resin solution 3 from preparation example 3, 20.7 parts by weight of butyl glycol, 16.4 parts by weight of sec-butanol, and 3.8 parts by weight of a commercially customary wetting agent, with stirring, and the mixture was dispersed using a bead mill. The result was the aqueous base color (A1). Here again, the degree of pigmentation was determined by the desired flow behavior and the desired rheology.

Preparation Example 8

Preparation of a Water-Free Color- and Effect-Imparting Base Color (A1)

25 parts by weight of a blue pearl effect pigment were mixed with 14.3 parts by weight of the polyurethane resin solution 2 in preparation example 2, 14.3 parts by weight of sec-butanol, 3.3 parts by weight of butyl glycol, 3.3 parts by weight of a commercially customary wetting agent, and 2.0 parts by weight of a pyrogenic silica and the mixture was homogenized in a dissolver for ten minutes. 37.5 parts by weight of the polyurethane resin solution 2 were added to the resultant mixture, giving the base color (A1).

Inventive Examples and Comparative Example

Preparation of an Inventive and of a Noninventive Coating Material, and Production of Inventive and Noninventive Multicoat Systems The coating materials were prepared by mixing of their constituents. The table gives an overview of the composition used in each case. The viscosity was in each case approximately 18 s in the DIN 4 cup at 20° C.

TABLE

The composition of the inventive coating material (inventive example) and of the noninventive coating material (comparative example)

| | Inventive example | Comparative example |
|---|---|---|
| Constituent: | | |
| Mixing varnish (B) from preparation example 4 (g) | 13.1 | 42.6 |
| Aqueous base color (A2) from preparation example 6 (g) | 26.3 | — |
| Water-free base color (A1) from preparation example 7 (g) | — | 13.8 |
| Water-free base color (A1) from preparation example 8 (g) | 11.0 | 4.0 |
| Rheology module (IV) from preparation example 5 (g) | 49.6 | 39.6 |
| Properties: | | |
| Pigment content (%) | 8.0 | 2.9 |
| Hiding power (μm) | 10 | 20 |

The comparison of the inventive example with the comparative example shows that the inventive coating material could be furnished with a higher pigment content than the noninventive coating material.

To produce the multicoat systems, phosphated steel panels which had been given an electrodeposition coating based on a commercially customary electrocoat material and a primer-surfacer coat based on a commercially customary aqueous primer-surfacer were coated with the coating material of the inventive example and with the coating material of the comparative example. After a flashoff time of 30 minutes at room temperature in each case, the wet films were overcoated with a commercially customary, conventional two-component clearcoat material based on a hydroxyl-containing acrylate copolymer binder and a polyisocyanate crosslinker and were dried at 60° C. for 30 minutes.

This gave multicoat systems having a basecoat with a thickness of 12 to 15 μm and a clearcoat with a thickness of from 40 to 45 μm. In terms of the overall visual impression it gave, the inventive multicoat system was clearly superior to the noninventive system.

The hiding power of the basecoats was determined by applying the inventive and noninventive coating materials to a black/white contrast card and measuring the dry film thickness at which the contrast cards were fully obscured. As is evident from comparing the data in the table, the inventive basecoat was clearly superior to the noninventive basecoat in this respect as well.

The invention claimed is:

1. A process for preparing an aqueous coating material with precisely defined shade and optical effect, comprising mixing modules differing in material composition and function and stored separately from one another shortly before application of the coating material, wherein the modules comprise:
(I) at least one module comprising less than 5% by weight water that provides at least one of color and effect, comprising:
(A1) at least one base color comprising less than 5% by weight water that imparts at least one of color and effect comprising:
(a11) at least one binder, wherein the at least one binder is optionally water-soluble or water-dispersible;
(a12) at least one pigment that imparts at least one of color and effect; and
(a13) at least one organic solvent, wherein the at least one organic solvent is optionally water-miscible;
and optionally, at least one of:
(a14) at least one crosslinking agent;
(a15) at least one auxiliary; and
(a16) at least one additive;
(II) at least one aqueous color module, comprising:
(A2) at least one aqueous color-imparting base color, comprising:
(a21) 10 to 80% by weight of at least one water-soluble or water-dispersible binder;
(a22) 1 to 70% by weight of at least one inorganic color pigment or 1 to 30% by weight of at least one organic color pigment, optionally a combination of at least one organic color pigment and at least one inorganic color pigment; and
(a23) 10 to 89% by weight water when 1 to 30% by weight of at least one organic color pigment is present, or 20 to 89% by weight water when 1 to 70% by weight of at least one inorganic color pigment is present;
and optionally, at least one of:
(a24) at least one organic solvent, wherein the at least one organic solvent is optionally water-miscible;
(a25) at least one crosslinking agent;
(a26) at least one auxiliary; and
(a27) at least one additive;
and
(III) at least one pigment-free mixing varnish module, comprising:
(B) at least one aqueous, pigment-free mixing varnish, comprising:
(b1) at least one water-soluble or water-dispersible binder; and
(b2) water;
and optionally, at least one of:
(b3) at least one crosslinking agent;
(b4) at least one auxiliary; and
(b5) at least one additive;
and optionally:
(IV) at least one pigment-free rheology module, comprising:
(C) an aqueous medium, comprising:
(c1) at least one rheology control additive;
optionally, with the proviso that at least one of the at least one additives (a16), (a27), and (b5) further comprises the at least one rheology control additive (c1).

2. The process of claim 1, wherein the at least one base color (A1) imparts one of i) effect or ii) color and effect.

3. The process of claim 1, wherein the modules comprise one of:
(i) the at least one module (I) comprising less than 5% by weight water that provides color, the at least one aqueous color module (II), and the at least one pigment-free mixing varnish module (III),
(ii) the at least one module (I) comprising less than 5% by weight water that provides color and effect, the at least one aqueous color module (II), and the at least one pigment-free mixing varnish module (III), and
(iii) the at least one module (I) comprising less than 5% by weight water that provides effect, the at least one aqueous color module (II), and the at least one pigment-free mixing varnish module (III).

4. The process of claim 1, wherein the at least one additive (b5) comprises the at least one rheology control additive (c1).

5. The process of claim 1, wherein the modules comprise the at least one pigment-free rheology module (IV).

6. The process of claim 1, wherein the at least one binder (a11), the at least one water-soluble or water-dispersible binder (a21), and the at least one water-soluble or water-dispersible binder (b1) are of a same polymer class.

7. The process of claim 6, wherein the at least one binder (a11), the at least one water-soluble or water-dispersible binder (a21), and the at least one water-soluble or water-dispersible binder (b1) are polyurethane resins.

8. The process of claim 1, wherein the at least one water-soluble or water-dispersible binder (a21) and the at least one water-soluble or water-dispersible binder (b1), and optionally the at least one binder (a11), comprise functional groups that can be converted into anions by at least one of neutralizing agents and anionic groups.

9. A process for preparing an aqueous coating material with precisely defined shade and optical effect, comprising mixing modules differing in material composition and function and stored separately from one another shortly before application of the coating material, wherein the modules comprise:
(I) at least one module comprising less than 5% by weight water that takes on all of the function of effect and part of the function of coloring or serves solely for imparting effect, comprising:
(A1) at least one base color comprising less than 5% by weight water that imparts (i) color and effect or (ii) effect, comprising:
(a11) 10 to 80% by weight of at least one binder, wherein the at least one binder is optionally water-soluble or water-dispersible;
(a12) 0.5 to 70% by weight of at least one pigment that imparts (i) color and effect or (ii) effect; and
(a13) 10 to 89.5% by weight of at least one organic solvent, wherein the at least one organic solvent is optionally water-miscible;
and optionally, at least one of:
(a14) at least one crosslinking agent;
(a15) at least one auxiliary; and
(a16) at least one additive;
(II) at least one aqueous color module, comprising:
(A2) at least one aqueous color-imparting base color, comprising:
(a21) 10 to 80% by weight of at least one water-soluble or water-dispersible binder;
(a22) 1 to 70% by weight of at least one inorganic color pigment or 1 to 30% by weight of at least one organic color pigment, optionally a combination of at least one organic color pigment and at least one inorganic color pigment; and
(a23) 10 to 89% by weight water when 1 to 30% by weight of at least one organic color pigment is present, and 20 to 89% by weight water when 1 to 70% by weight of at least one inorganic color pigment is present;
and optionally, at least one of:
(a24) at least one organic solvent, wherein the at least one organic solvent is optionally water-miscible;
(a25) at least one crosslinking agent;
(a26) at least one auxiliary; and
(a27) at least one additive;
and (III) at least one pigment-free mixing varnish module, comprising:
(B) at least one aqueous, pigment-free mixing varnish, comprising:
(b1) at least one water-soluble or water-dispersible binder; and
(b2) water;
and optionally, at least one of:
(b3) at least one crosslinking agent;
(b4) at least one auxiliary; and
(b5) at least one additive;
and:
(IV) at least one pigment-free rheology module, comprising:
(C) an aqueous medium, comprising:
(c1) 0.5 to 50% by weight of at least one rheology control additive and 70 to 99.5% by weight of aqueous medium;
optionally, with the proviso that at least one of the at least one additives (a16), (a27), and (b5) further comprise the at least one rheology control additive (c1).

10. The process of claim 9 wherein the aqueous coating material that is prepared has a pigment content of at least about 8.0%.

11. The process of claim 9 wherein the at least one pigment-free rheology module comprises a phyllosilicate.

12. The process of claim 9 wherein the at least one base color (A1) comprises only effect pigments or only color pigments.

13. The process of claim 9 wherein the at least one base color (A1) comprises an effect pigment selected from the group consisting of metal flake pigment, pearlescent pigment, interference pigment, and mixtures thereof.

14. The process of claim 9 wherein the module (I) takes on all of the function of effect and part of the function of coloring.

15. The process of claim 9 wherein the module (I) serves solely for imparting effect.

16. The process of claim 9 wherein the binder (a11) in module (A1) is an acrylate addition copolymer, polyester, and/or polyurethane, each containing carboxylic and/or carboxylate groups and optionally hydroxyl groups, having a number-average molecular weight of from 850 to 20,000.

17. The process of claim 16, wherein the at least one binder (a11), the at least one water-soluble or water-dispersible binder (a21), and the at least one water-soluble or water-dispersible binder (b1) are polyurethane resins, and wherein the polyurethane resin (a11) has an acid number of 20 to 150 mg KOH/g.

18. The process of claim 9, wherein the at least one additive (b5) in the mixing varnish further comprises at least one rheology control additive.

19. The process of claim 17 wherein the process further comprises applying the coating material prepared using the modular system to a substrate to obtain a basecoat film and, following initial drying of the basecoat film, applying a clearcoat wet-on-wet to produce a multicoat color, or color and effect, coating system.

20. A process for preparing an aqueous basecoat coating material with precisely defined shade and optical effect, for use with a clearcoat applied wet-on-wet to produce a multicoat color, or color and effect, coating system, wherein the process comprises a modular system having mixing modules differing in material composition and function and stored separately from one another shortly before application of the coating material, wherein the module system consists of the following four modules:

(I) at least one module comprising less than 5% by weight water that takes on all of the function of effect and part of the function of coloring, comprising:
  (A1) at least one base color comprising less than 5% by weight water that imparts color and effect comprising:
    (a11) 10 to 80% by weight of at least one binder, wherein the at least one binder is optionally water-soluble or water-dispersible;
    (a12) 0.5 to 70% by weight of effect pigment and color pigment; and
    (a13) 10 to 89.5% by weight of at least one organic solvent, wherein the at least one organic solvent is optionally water-miscible;
  and optionally, at least one of:
    (a14) at least one crosslinking agent;
    (a15) at least one auxiliary; and
    (a16) at least one additive;
(II) at least one aqueous color module, comprising:
  (A2) at least one aqueous color-imparting base color, comprising:
    (a21) 10 to 80% by weight of at least one water-soluble or water-dispersible binder;
    (a22) 1 to 70% by weight of at least one inorganic color pigment or 1 to 30% by weight of at least one organic color pigment, optionally a combination of at least one organic color pigment and at least one inorganic color pigment; and
    (a23) 10 to 89% by weight water when 1 to 30% by weight of at least one organic color pigment is present, and 20 to 89% by weight water when 1 to 30% by weight of at least one organic color pigment is present;
  and optionally, at least one of:
    (a24) at least one organic solvent, wherein the at least one organic solvent is optionally water-miscible;
    (a25) at least one crosslinking agent;
    (a26) at least one auxiliary; and
    (a27) at least one additive;
and
(III) at least one pigment-free mixing varnish module, comprising:
  (B) at least one aqueous, pigment-free mixing varnish, comprising:
    (b1) from 10 to 80% by weight of at least one water-soluble or water-dispersible binder; and
    (b2) from 20 to 90% by weight of water;
  and optionally, at least one of:
    (b3) at least one crosslinking agent;
    (b4) at least one auxiliary; and
    (b5) at least one additive;
and:

(IV) at least one pigment-free rheology module, comprising:
  (C) an aqueous medium, comprising:
    (c1) 1.5 to 25% by weight of at least one rheology control additive and 75 to 98.5% by weight of aqueous medium;
  optionally, with the proviso that at least one of the at least one additives (a16), (a27), and (b5) further comprise the at least one rheology control additive (c1);
wherein the at least one binder (a11), the at least one water-soluble or water-dispersible binder (a21), and the at least one water-soluble or water-dispersible binder (b1) are polyurethane resins, and wherein the binder (a11) in module (A1) is a polyurethane containing carboxylic and/or carboxylate groups and optionally hydroxyl groups having a number-average molecular weight of from 850 to 20,000 and an acid number of 20 to 150 mg KOH/g.

21. The process of claim 1, wherein the at least one binder (a11), the at least one water-soluble or water-dispersible binder (a21), and the at least one water-soluble or water-dispersible binder (b1) are the same.

22. The process of claim 1, wherein the at least one binder (a11), the at least one water-soluble or water-dispersible binder (a21), and the at least one water-soluble or water-dispersible binder (b1) each comprise a mixture of at least two binders, and the mixing ratio of the binders in (a11), (a21), and (b1) is the same in each.

23. The process of claim 9, wherein the at least one rheology control additive (c1) present in module (IV) is crosslinked polymeric microparticles, an inorganic phyllosilicate, a silica, a polyvinyl alcohol, a poly(meth)acrylamide, a poly(meth)acrylic acid, a polyvinylpyrrolidone, a styrene-maleic anhydride copolymer or derivative thereof, a ethylene-maleic anhydride copolymer or derivative thereof, a hydrophobically modified ethoxylated urethane, a hydrophobically modified polyacrylate, or a combination comprising one or more of the foregoing rheology control additives.

24. The process of claim 1, wherein said pigment (a12) comprises metal flake effect pigment.

25. The process of claim 24, wherein said metal flake pigment comprises aluminum flake.

26. The process of claim 9, wherein said pigment (a12) comprises metal flake effect pigment.

27. The process of claim 26, wherein said metal flake pigment comprises aluminum flake.

28. The process of claim 1, wherein the module (II) serves solely for imparting color.

29. The process of claim 15, wherein the module (II) serves solely for imparting color.

* * * * *